(12) United States Patent
Orhan et al.

(10) Patent No.: US 11,528,066 B2
(45) Date of Patent: Dec. 13, 2022

(54) NON-ORTHOGONAL MULTIPLE-ACCESS AND MULTI-FINGER BEAMFORMING

(71) Applicant: Intel Corporation, Santa Clara, CA (US)

(72) Inventors: Oner Orhan, San Jose, CA (US); Ehsan Aryafar, San Jose, CA (US); Brent Carlton, Portland, OR (US); Nageen Himayat, Fremont, CA (US); Christopher Hull, Portland, OR (US); Navid Naderializadeh, Santa Clara, CA (US); Hosein Nikopour, San Jose, CA (US); Stefano Pellerano, Beaverton, OR (US); Mustafijur Rahman, Hillsboro, OR (US); Shilpa Talwar, Cupertino, CA (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 17/040,474

(22) PCT Filed: Jul. 12, 2018

(86) PCT No.: PCT/US2018/041813
§ 371 (c)(1),
(2) Date: Sep. 22, 2020

(87) PCT Pub. No.: WO2020/013827
PCT Pub. Date: Jan. 16, 2020

(65) Prior Publication Data
US 2021/0028840 A1   Jan. 28, 2021

(51) Int. Cl.
H04B 7/06    (2006.01)
H04B 7/0456  (2017.01)
(Continued)

(52) U.S. Cl.
CPC ......... *H04B 7/0617* (2013.01); *H04B 7/0456* (2013.01); *H04B 7/0626* (2013.01);
(Continued)

(58) Field of Classification Search
CPC .. H04B 7/0617; H04B 7/0456; H04B 7/0626; H04B 7/024; H04W 16/28; H04W 72/1247; H04W 88/12
See application file for complete search history.

(56) References Cited

U.S. PATENT DOCUMENTS

| 2013/0250868 A1* | 9/2013 | Yue | H04L 5/0037 370/329 |
| 2015/0263794 A1* | 9/2015 | Lee | H04B 7/024 375/267 |

(Continued)

FOREIGN PATENT DOCUMENTS

DE   112018007826   4/2021

OTHER PUBLICATIONS

"International Application Serial No. PCT US2018 041813, International Preliminary Report on Patentability dated Jan. 21, 2021", 8 pgs.

(Continued)

*Primary Examiner* — Steven H Nguyen
(74) *Attorney, Agent, or Firm* — Schwegman Lundberg & Woessner, P.A.

(57) ABSTRACT

Methods, apparatus, and computer-readable media are described to use multi-finger beamforming for multimeter wave communications. A base station associates with first and second user equipment. Weight sum rates are determined for the user equipment. Transmissions are scheduled to the user equipment based on the weight sum rates. Data is encoded for the first user equipment and transmitted based on the schedule. Data is encoded for the second user (Continued)

equipment and transmitted based on the schedule. The transmissions are multiplexed in the power domain.

18 Claims, 30 Drawing Sheets

(51) Int. Cl.
    *H04W 16/28* (2009.01)
    *H04W 72/12* (2009.01)
    *H04W 88/12* (2009.01)

(52) U.S. Cl.
    CPC ....... *H04W 16/28* (2013.01); *H04W 72/1247* (2013.01); *H04W 88/12* (2013.01)

(56) References Cited

U.S. PATENT DOCUMENTS

| | | | |
|---|---|---|---|
| 2015/0282185 A1* | 10/2015 | Nikopour | H04L 1/0015 370/329 |
| 2015/0365908 A1 | 12/2015 | Maltsev et al. | |
| 2016/0087694 A1 | 3/2016 | Vilaipornsawai et al. | |
| 2016/0233994 A1* | 8/2016 | Prasad | H04W 72/06 |
| 2017/0041178 A1* | 2/2017 | Perotti | H04L 1/0047 |
| 2019/0116560 A1* | 4/2019 | Naderializadeh | H04W 40/08 |

OTHER PUBLICATIONS

"International Application Serial No. PCT/US2018/041813, International Search Report dated May 8, 2019", 4 pgs.

"International Application Serial No. PCT/US2018/041813, invitation to Pay Additional Fees and Partial Search Report dated Mar. 8, 2019", 7 pgs.

"International Application Serial No. PCT/US2018/041813, Written Opinion dated May 8, 2019", 6 pgs.

Mattia, Rebato, et al., "Hybrid Spectrum Access for mmWave Networks", (May 2016).

Nadisanka, Rupasinghe, et al., "Non-Orthogonal Multiple Access for mmWave Drones with Multi-Antenna Transmission", (Nov. 2017).

\* cited by examiner (A) REAL TAP (B) COMPLEX TAP

NON-ORTHOGONAL MULTIPLE-ACCESS AND MULTI-FINGER BEAMFORMING This application is a U.S. National Stage Filing under 35 U.S.C. 371 from International Application No. PCT/US2018/041813, filed Jul. 12, 2018 and published in English as WO 2020/013827 on Jan. 16, 2020, which is incorporated herein by reference in its entirety.

FIELD OF THE DISCLOSURE

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR)(or 5G-NR) networks and 5G-LTE networks.

BACKGROUND

Mobile communication has evolved significantly from early voice systems to today's highly sophisticated integrated communication platform. The next generation (5G+) cellular system is envisioned to have 1,000 times more data traffic than current cellular systems. To realize a 1,000-fold data volume increase, use of new frequency bands such as millimeter wave (mmWave) bands and densification of the network, e.g., ultra-dense networks (UDN), will be two key enablers. The high propagation loss, directivity, hardware impairments (wideband filters, phase noise, etc.), and channel dynamics due to mobility of 20 mmWave communications require new thoughts and insights in architectures and protocols. The below 6 GHz bands, e.g., LTE, etc., are already congested and have limited data capacity. As a solution, the large spectrum of millimeter bands may be considered for high data rates. However, due to high path loss of mmWave bands, phased array antenna systems are required to have beamforming gin. However, phased array s have a limited number of antenna ports which limits both the number of users that may be served at a time and the average cell throughput for cellular mmWave communications.

BRIEF DESCRIPTION OF THE DRAWINGS

The present disclosure is illustrated by way of example and not limitation in the figures of the accompanying drawings, in which like references indicate similar elements and in which.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

DESCRIPTION

Various aspects describe a multi-beam analog beamforming with non-orthogonal multiple access (NOMA) scheme for mmWave phased array systems. With these aspects, the average cell throughput may increase by as much as 10% compared to current mmWave communication systems. The NOM A scheme allows a transmitter to serve multiple users with a singe radio frequency (RF) chain. In addition, the transmitter may serve multiple users in different directions based on the multi-finger beamforming Thus, aspects described herein increase the cell throughput and allow users in different directions to be served using a single RF chain.

Figure 1:
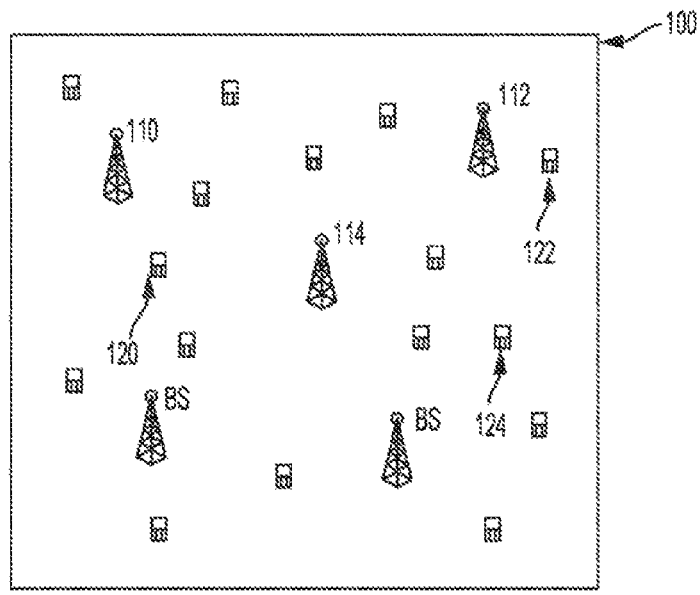
FIG. 1 illustrates a millimeter (mm) wave (mmWave) cellular network in accordance with some aspects.

FIG. 1 illustrates a millimeter (mm) wave (mmWave) cellular network 100 in accordance with some aspects. The network 100 includes multiple base stations such as 110, 112, and 114 and multiple user equipments (UEs) such as 120, 122, and 124. The base stations 110, 112, and 114 and the UEs 120, 122, and 124 may include an analog phased antenna array, such as analog and hybrid beamforming arrays with single or multiple antenna ports (RF-chains).

Figure 2:
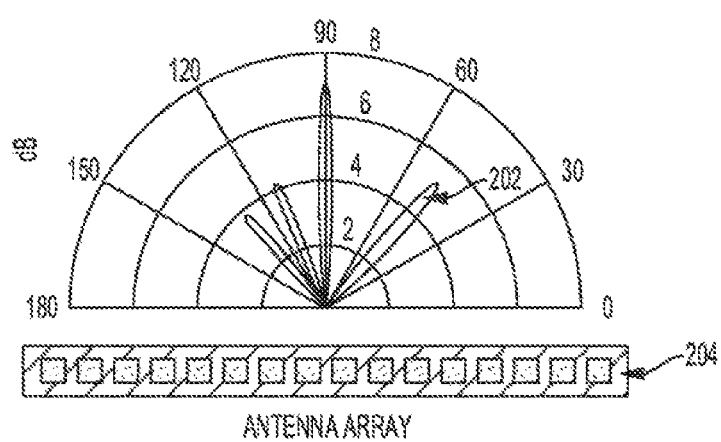
FIG. 2 illustrates a uniform linear array with multi-finger beamforming in accordance with some aspects.

FIG. 2 illustrates a uniform linear array with multi-finger beamforming in accordance with some aspects. For simplicity, a single antenna port at the base station (BS) and UEs, e.g., analog beamforming with analog phase shifters, is shown in FIG. 2. Known systems that have a BS use single beam direction with a discrete Fourier transform (DFT) codebook serve only a singe user at a time. Forming a singe directional beam will limit cell throughput of multi-user communications since the probability of having multiple user in the same direction may be very low when the number of antennas are very large and user density is low.

To allow serving multiple users, various aspects described herein are related to multi-finger beamforming and multiple-user scheduling with non-orthogonal multiple access techniques. Cell throughput may be improved by enabling multi-directional beamforming. Multi-finger beamforming may be designed by adjusting phase shifter values. An algorithm to design beamforming may take desired beam directions, beamforming pins, and maximum side-lobe level as an input and generate least square optimal phase shifter values to create the desired beam pattern. An example beam pattern 202 for 16 antenna elements 204 is shown in FIG. 2. In disclosed systems, the algorithm to design the required beam patterns may be implemented at the BS.

A cellular network, such as network 100, may be described with the following model. Transmit power of a BS may be denoted by $P_t$. Distance between $BS_i$ and $UE_j$ may be denoted by $d_{ji}$, j=1, ..., N and i=1, ..., K, and the path loss between $BS_i$ and $UE_j$ as $l(d_{ji})$. The total number of antennas at the BS and UE are assumed as $N_{bs}$ and $N_{ue}$, respectively. The beamforming gain from $BS_i$ to $UE_j$ may be denoted as $G_{ji}$, which takes into account both the transmitter and the receiver beamforming gin, e.g., $G_{ji}=10 \log_{10}(N_{ue} N_{bs})$. Therefore, at each scheduling interval, considering synchronous transmission of the BS, the received downlink signal-to-noise-plus-interference ratio (SNIR) at $UE_j$ may be written as:

$$SNIR_{ji} = \frac{P_t G_{ji} l(d_{ji})}{\sigma^2 + \sum_{i=1}^{N} P_t G_{ji} l(d_{ji})},$$

where $\sigma^2$ is noise power.

Figure 3:
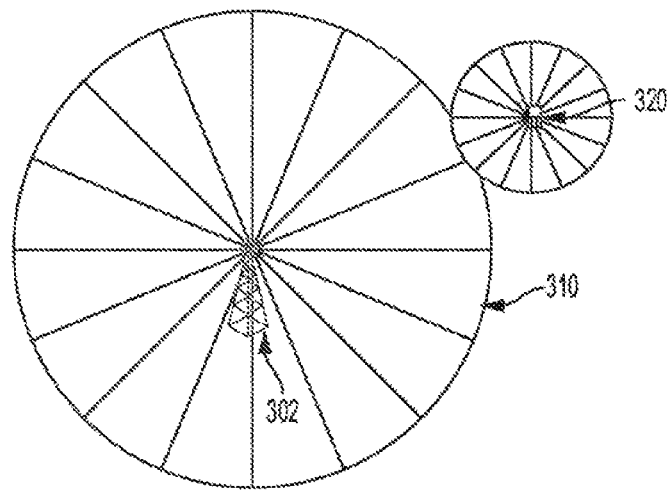
FIG. 3 illustrates directional sector sweeping in accordance with some aspects.

In an aspect, both the BS and the UE perform a sector level sweep (SLS) procedure in which the BS and the UE form a single beam sequentially covering all the directions to find best transmit and receive sectors. FIG. 3 illustrates directional sector sweeping in accordance with some aspects. Abase station 302 divides the directions into half power beam widths, $\theta_{HPBW}$, such that there is a total of $$\frac{360}{\theta_{HPBW}}$$

beams, such as 310, at the BS 302. In various aspects, the value of $\theta_{HPBW}$ may be between 10 and 45.

Ignoring inter-cell interference, during the SLS each UE 320 measures the strongest reference signal received power (RSRP) from all neighboring BSs, e.g., 302. Then, each user associates with a single BS which is the BS that the UE 320 receives the strongest reference signal through the beam-formed channel. Note that this association rule may be extended when there is interference in which case the association rule may be based on the signal-to-interference and noise ratio (SINR). In short, the index of the BS associated with j'th user equipment may be denoted by:

$$i_j = \max_{i \in 1,...,N} P_t G_{ji} l(d_{ji}).$$

User scheduling may be done to align with proportional fairness criteria. The instantaneous rate of user j may be denoted by $r_j(t)$. For proportional fairness, the weighted sum rate of users at the i'th BS may be maximized as follows: $R_i(t) = \sum_{j \in i_j} w_j(t) r_j(t)$, where weights $w_j$ are defined according to the proportional fairness criteria. For example, the weights may be calculated according to instantaneous feedback from the users as follows:

$$w_j(t) = \frac{1}{(1-\alpha)\bar{r}_j(t-1) + \alpha r_j(t)},$$

where $\alpha$ is forgetting factor and $\bar{r}_j(t-1)$ is average rate of user j until time t−1.

Using beamforming multiple users may be serviced by a single BS RF chain. Aspects are directed to using a non-orthogonal multiple access (NOMA) scheme in which the messages of the UEs are multiplexed in the power domain, which may result in higher rates than orthogonal multiple access techniques. Some aspects focus on two user NOMA techniques, but the techniques may be extended to more than two users.

Consider users UE m and n associated to i'th BS with beam formed channel $G_{mi}l(d_{mi})$ and $G_{ni}l(d_{ni})$, respectively. Without loss of generality, assume $SNIR_{ni} < SNIR_{mi}$ which means that UE n ("weak" UE) has a lower channel quality than UE m ("strong" UE). Therefore, consider that UE n decodes its own message by treating UE M's message as noise. On the other hand, the strong UE first decodes weak UE's message while treating its own message as noise, and then cancels the weak user's interference to decode its own message. This implies that the achievable rate by UE m is:

$$r_m(t) = \log_2\left(1 + \frac{(1-\beta)P_t G_{mi}l(d_{mi})}{\sigma^2 + \sum_{i=1}^{N} P_t G_{mi}l(d_{mi})}\right),$$

where $\beta$, $0 \leq \beta \leq 1$, is a power sharing parameter which defines the fraction of BS power allocated to the UE n and the remaining power is allocated to the UE m. The achievable rate b UE n is given by $$r_n(t) = \log_2\left(1 + \frac{\beta P_t G_{ni}l(d_{ni})}{(1-\beta)P_t G_{ni}l(d_{ni}) + \sigma^2 + \sum_{i=1}^{N} P_t G_{ni}l(d_{ni})}\right).$$

In the above achievable rates, the optimal power allocation parameter f may be given by:

$$\beta = 1 - \frac{w_m(t)SNIR_{mi} - w_n(t)SNIR_{ni}}{SNIR_{mi}SNIR_{ni}(w_n(t) - w_m(t))}.$$

In one aspect, if the above equation results in $\beta \leq 0.5$ or $\beta > 1$, then all the available power is allocated to the strong user, i.e., $\beta = 0$.

Figure 4A:
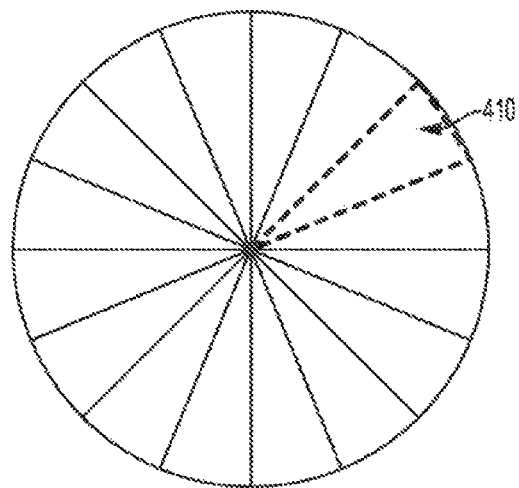
FIG. 4A illustrates a singe beam with maximum beamforming in accordance with some aspects.
Figure 4B:
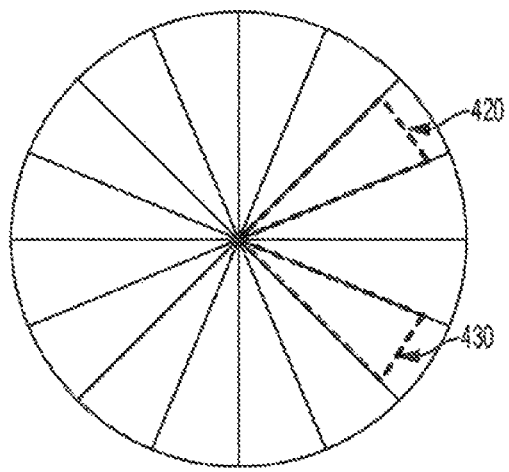
FIG. 4B illustrates two beams with beamforming gains in accordance with some aspects.

In an aspect, beamforming is used for mmWave multi-user communications. Beamforming may be accomplished with a singe directional beam or using multi-directional beams. FIG. 4A illustrates a single beam 410, as a dotted line, with maximum beamforming in accordance with some aspects. The maximum beam forming gain is $10 \log_{10} N_{bs}$ for a single beam such as the single beam 410. FIG. 4B illustrates two beams 420 and 430 with beamforming gains in accordance with some aspects. When there are multiple beams, such as beams 420 and 430, there is a gain loss at the beams due to splitting the gain into multiple beams. The beamforming gain loss at the fingers may be denoted by $\Delta_{fi}$, i=1, . . . , F, where F is the total number of fingers. The beamforming gains for beams 420 and 430 may be denoted as $(10 \log_{10} N_{bs} - \Delta_{f1})$ and $(10 \log_{10} N_{bs} - \Delta_{f2})$.

Figure 5:
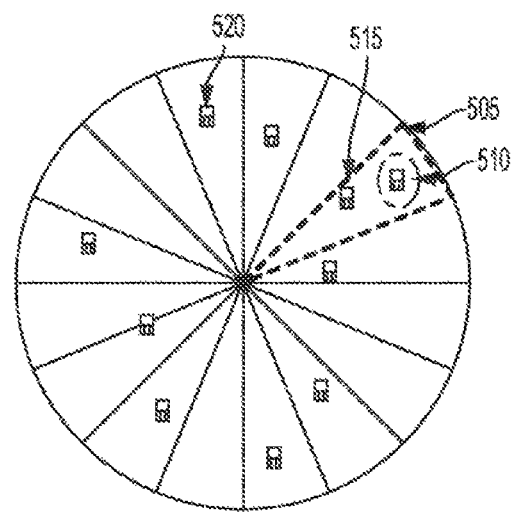
FIG. 5 illustrates singe directional beam and singe user scheduling in accordance with some aspects.

To support multiple UEs, user scheduling may be done. FIG. 5 illustrates single directional beam and single user scheduling in accordance with some aspects. A BS may form a single beam 505 for a UE 510. For the illustrated schedule, the beam 505 is for the UE 510 and other UEs such as UE 515 and 520, etc., are not serviced by the beam 505. Other UEs 515 and 520 may be serviced by additional beams during other scheduling periods. In the case shown in FIG. 5, the BS may form the singe beam 505 with full transmit power to a user with the highest weighted rate. Accordingly, the index of scheduled $$j^* = \operatorname*{argmax}_{j \in i_j} w_j(t) r_j(t).$$

Figure 6:
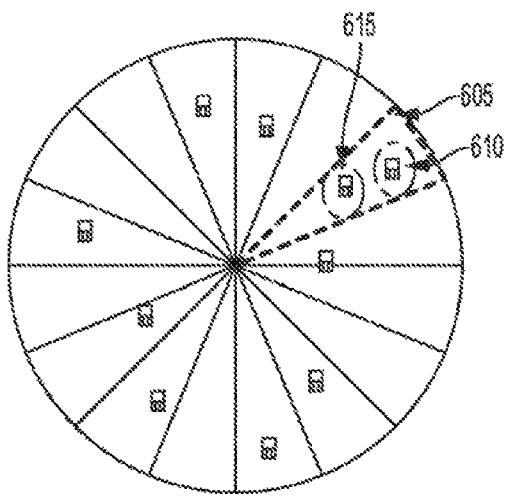
FIG. 6 illustrates singe directional beamforming and two-user non-orthogonal multiple access (NOM A) scheduling in accordance with some aspects.

FIG. 6 illustrates singe directional beamforming and two-user non-orthogonal multiple access (NOMA) scheduling in accordance with some aspects. In FIG. 6, a BS forms a single beam and applies non-orthogonal multiple access scheme to two UEs 610 and 615, which are located in the same beam direction of beam 605. The UEs which have a maximum weighted sum rate are scheduled for transmission. Accordingly, the index of a scheduled user is given by k*, l*:

$$k^*, l^* = \arg\max_{k,l = \{j \in i_j\}} w_k(t) r_k(t) + w_l(t) r_l(t).$$

Figure 7:
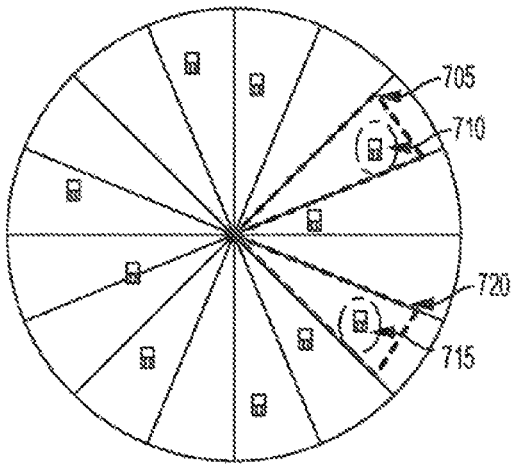
FIG. 7 illustrates two directional beamforming and NOMA two user scheduling in accordance with some aspects.

FIG. 7 illustrates two directional beamforming and NOMA two user scheduling in accordance with some aspects. In FIG. 7, a BS forms two beams 705 and 720 and applies non-orthogonal multiple access scheme to two UEs 710 and 715. In this case, the UEs may be located in any direction since multi-finger beamforming has the flexibility of forming beams in any direction. Thus, UE 710 is serviced by beam 705 while UE 715 is served by beam 720. The UEs that have the maximum weighted sum rate are scheduled for transmission. Accordingly, the index of scheduled user is given by k*, l*:

$$k^*, l^* = \underset{k,l=\{j\in i_j \cap \forall j \text{ in the same beam}\}}{\operatorname{argmax}} w_k(t)r_k(t) + w_l(r)r_l(t).$$

Due to flexibility of forming beam with different beam gains, the weighted sum rate may be further optimized by adjusting beam gains as follows:

$$\underset{G_{ki},G_{li}\in\mathcal{F}}{\max} w_k(t)r_k(t) + w_l(t)r_l(t) \text{ s.t. } w_k(t)G_{ki}l(d_{ki}) = w_l(t)G_{li}l(d_{li}),$$

where $\mathcal{F}$ is a feasible beamforming gin set given by a beamforming algorithm. In one aspect, the BS may schedule one or more UEs based on the UEs that have the highest weighted rate. Those UEs may then receive data from the BS based on beamforming for the UEs.

Performance of the disclosed mmWave cellular system may be modeled using known methods. In a model, there are N BSs independently distributed according to a homogenous poison point process (PPP) of density $\lambda_{bs}$ over an area. K UEs are also distributed with an independent PPP of density $\lambda_{ue}$. For a given distance d between BS and UE, the path loss between them is generated by:

$$l(d) = \begin{cases} C_L d^{-\alpha_L}, w \cdot p \cdot p_{LOS}(d) \\ C_N d^{-\alpha_N}, w \cdot p \cdot 1 - p_{LOS}(d) \end{cases},$$

where $C_L$ and $C_N$ are line-of-sign (LOS) and non-line-of-sight (NLOS) intercept points, and $\alpha_L$ and $\alpha_N$ are path loss exponents for LOS and NLOS channels, respectively. In the above equation, the probability of being in a LOS channel is given by $$p_{LOS}(d) = \min\left(\frac{A}{d}, 1\right)\left(1 - e^{-\frac{d}{B}}\right) + e^{-\frac{d}{B}},$$

where A=6.659 m and B−129.9 m.

Figure 8:
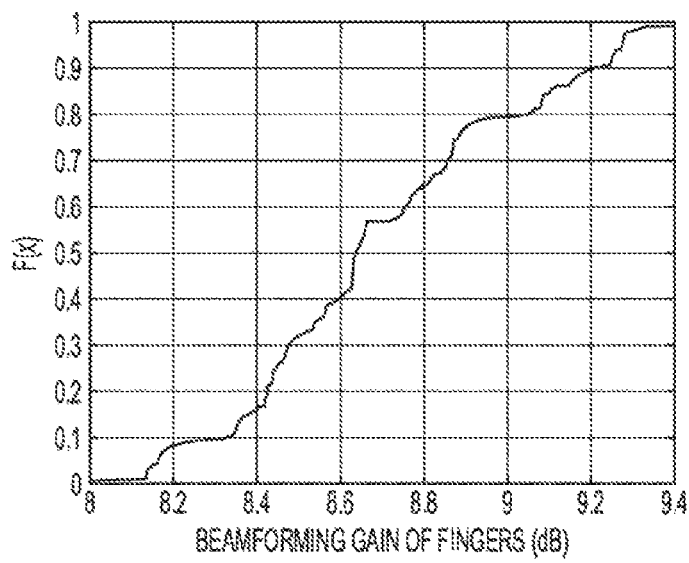
FIG. 8 illustrates a cumulative distribution function (CDF) curve for beam gain of a two-finger codebook in accordance with some aspects.

Using this model, the performance of a multi-finger codebook for 16 antenna elements at the BS was modeled. Two beams directed towards a random direction in azimuth angles of 45 to 135 degrees were considered. FIG. 8 illustrates a cumulative distribution function (CDF) curve for beam gain of a two-finger codebook in accordance with some aspects. As shown in FIG. 8, the minimum beamforming gin is 8 dB, which corresponds to a maximum beamforming gain loss of 4 dB.

According to FIG. 8, the worst case beamforming gain loss is taken into account. Based on the worst case beamforming gain loss, the assumption is that there is a 4 dB loss when using two-finger beamforming. For the tested model, the following variables were used: $\theta_{HPBW}$=10 degrees, $\lambda_{bs}$=0.0001, and $\lambda_{ue}$=0.001. In addition, the following parameters were used: $P_t$=30 dBm and the maximum BS and the UE beamforming gain was set to $G_{ji}$=24 dB, $\forall_{ji}$. TABLE 1 below shows the average cell throughput of the modeled mmWave cellular system. Using all three types of scheduling the average throughout of a cell increased by 10%.

TABLE 1

| | 1. Single directional beamforming and single user scheduling | 1. Single directional beamforming and single user scheduling 2. Single directional beamforming and two-user NOMA scheduling | 1. Single directional beamforming and single user scheduling 2. Single directional beamforming and two-user NOMA scheduling 3. Two directional beamforming and NOMA two-user scheduling |
|---|---|---|---|
| Avg. Cell Throughput | 6.97 Gbps | 7.32 Gbps (+5%) | 7.67 Gbps (+10%) |
| | | Occurrence | |
| 1. Single directional beamforming and single user scheduling | 100% | 72% | 32.7% |
| 2. Single directional beamforming and two-user NOMA scheduling | 0% | 28% | 25.8% |
| 3. Two directional beamforming and NOMA two-user scheduling | 0% | 0% | 41.5% |

Full duplex operation allows a radio to transmit and receive signal at the same time. However, in a traditional radio the transmitter causes interference in the receiver due to simultaneous operation. This interference makes it impossible to achieve full-duplex operation without taking into account the interference. One aspect of the invention is directed to a low power self-interference canceller system that may be based on a complex tap finite impulse response (FIR) filter. In an aspect, the filter is suitable for silicon implementation which performs the interference cancellation. A complex tap FIR filter is very powerful in replicating a self-interference channel because of its independent control on the group delay and the carrier phase shift introduced by the channel. Further, the leakage channel itself has a "complex" response, which may be replicated by a "complex" tap-based FIR filter.

Various aspects enable simultaneous multi-channel operation in RF transceivers which may be used in different communication standards including Wi-Fi, Bluetooth, global system for mobile communications (GSM), etc. The simultaneous multi-channel operation allows two independent communication links to be used at the same time, thereby, doubling the number of independent users. As a result, radios using the various described aspects may support twice the number of users compared to known radios. The increase in the number of users makes the various described aspects attractive in emerging connectivity markets such as Internet-of-Things (IoT) hardware solutions, wearables, and sensor networks.

Various known filters may use off-chip cables, require multiple frequency translations or require a large number of taps. These known filters have a variety of disadvantages. For example, filters using off-chip coaxial cables have a large form factor and cannot be implemented in silicon. In addition, needing multiple frequency translations such as a down-conversion and then an up-conversion impairs the feedforward cancelling signal with noise and non-linearity that may deteriorate the quality of the main received signal. Filters using a large number of real taps, rather than complex taps, have an increased power consumption compared to disclosed filters that use complex taps. The off-chip transmission line delay may also real taps that are large, making a silicon implementation costly and too large to be feasible.

Figure 9:
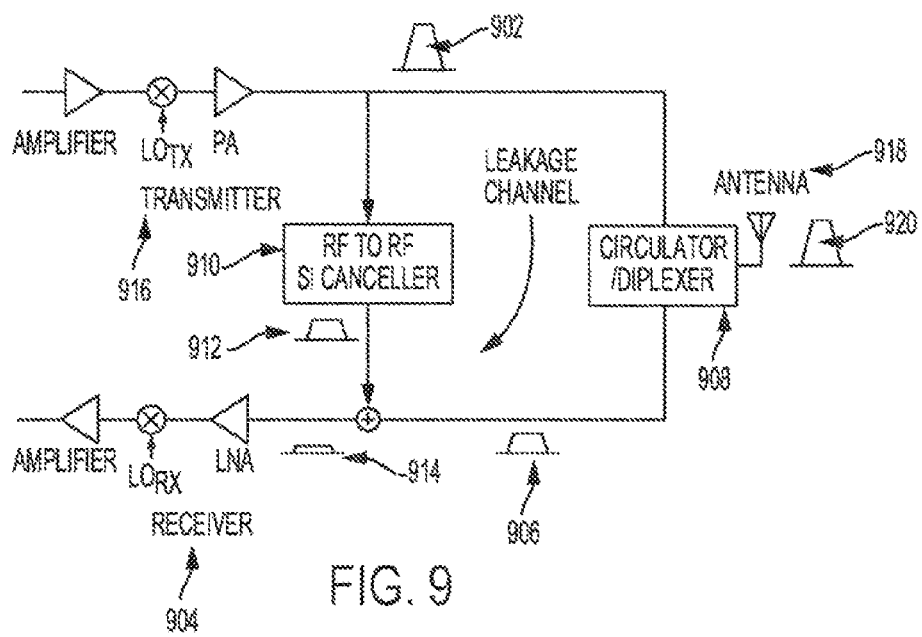
FIG. 9 illustrates a full duplex transceiver with a self-interference canceller in accordance with some aspects.

FIG. 9 illustrates a full duplex transceiver with a self-interference canceller in accordance with some aspects. In full duplex operation, both the transmitter and receiver operate at the same time. A signal to transmit 902 is generated by a transmitter 916. The signal to transmit 902 may eventually be transmitted via one or more antenna 918 as a transmitted signal 920. The signal to transmit 902 may act as a blocker to a receiver 904 which is known as a self-interference signal 906. The isolation provided by a diplexer/circulator 908 may not be sufficient, and as a result, the self-interference signal 906 may compress the receiver 904 thereby affecting its functionality. To mitigate this issue, a RF self-interference (SI) canceller 910 may be used which taps the transmitted signal 902 and generates a replica of the self-interference signal 912 by mimicking the leakage channel response through the diplexer/circulator 908. This replica 912 is subtracted from the self-interference signal 906 at the receiver input to achieve cancellation 914 thereby preventing the receiver 904 from compression.

Figure 10A:
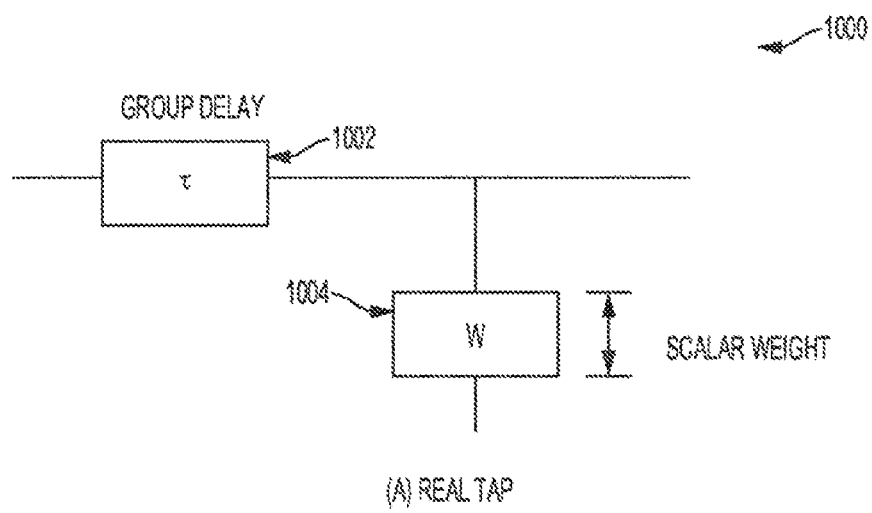
FIG. 10A illustrates a real tap.
Figure 10B:
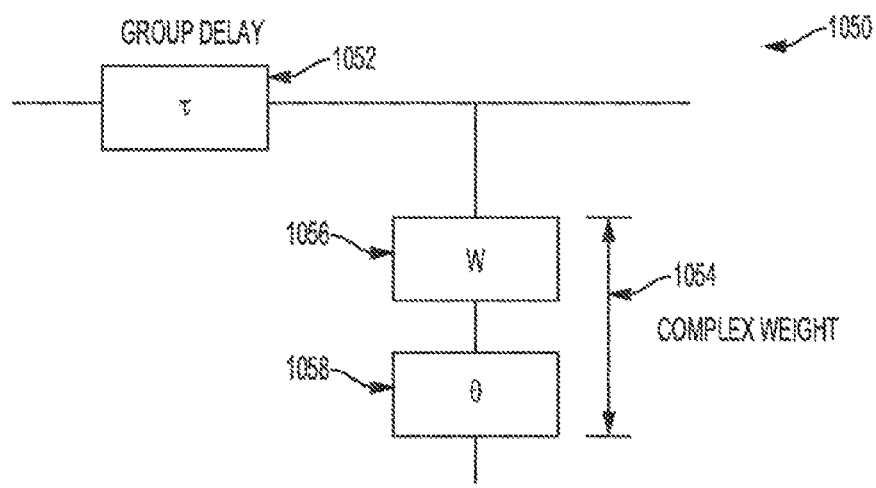
FIG. 10B illustrates a complex tap in accordance with some aspects.
Figure 11:
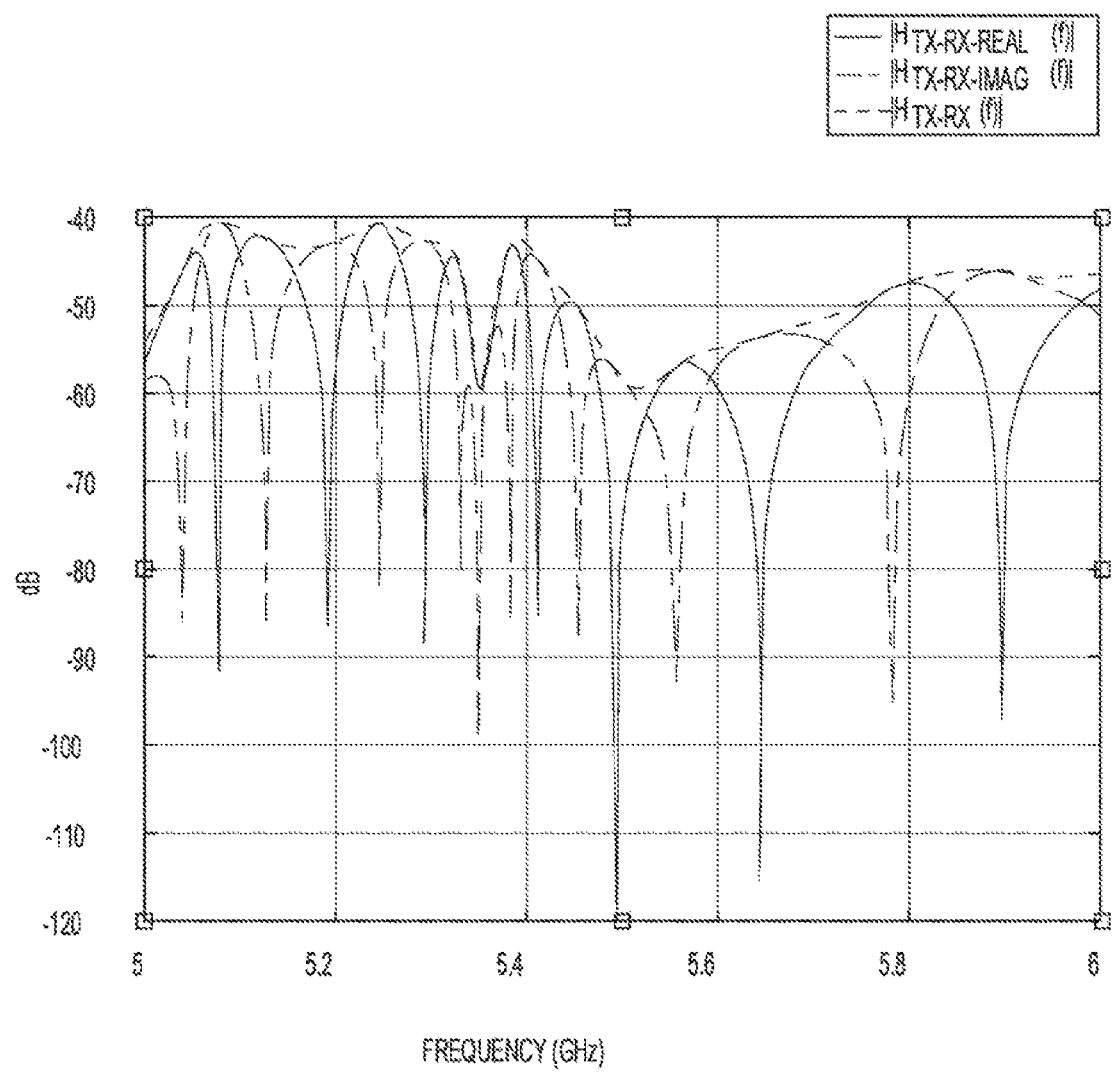
FIG. 11 shows the complex response of a leakage channel with different in-phase and quadrature phase frequency responses.

The RF SI canceller may be an FIR filter which may be implemented using either real taps or complex taps. FIG. 10A illustrates a real tap 1000. The real tap 1000 includes a time delay cell 1002 and a scalar weight 1004. FIG. 10B illustrates a complex tap 1050 in accordance with some aspects. In contrast to the real tap 1000, the complex tap 1050 includes a time delay cell 1052 and a complex weight 1054 which has both a magnitude 1056 and a phase 1058. Generally, a complex tap is very effective in mimicking the channel response because the channel response itself is complex FIG. 11 shows the complex response of a leakage channel with different in-phase and quadrature phase frequency responses.

Figure 12:
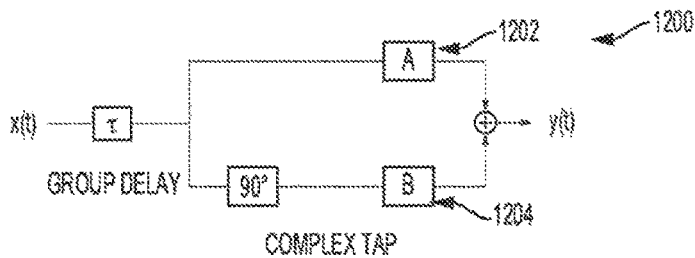
FIG. 12 illustrates a complex tap in accordance with some aspects.
Figure 13:
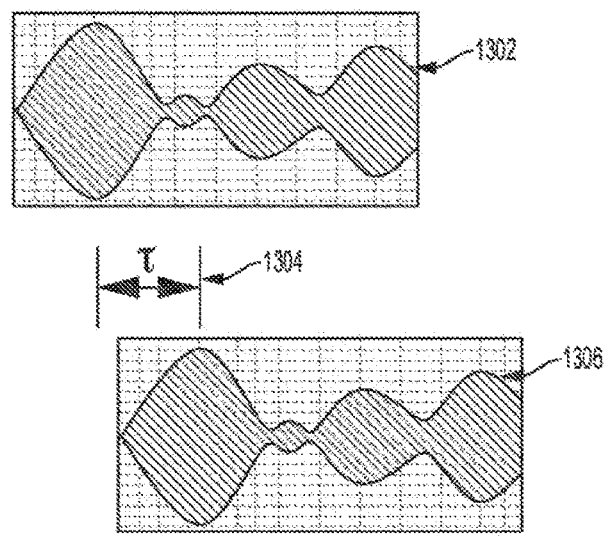
FIG. 13 illustrates an envelope delay for a modulate signal in accordance with some aspects.
Figure 14:
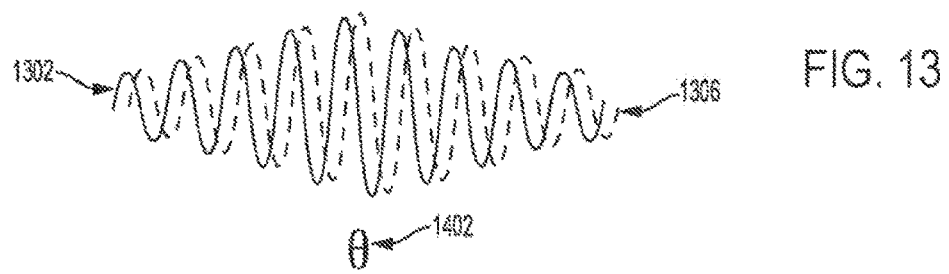
FIG. 14 illustrates a carrier phase shift for a modulate signal in accordance with some aspects.
Figure 15:
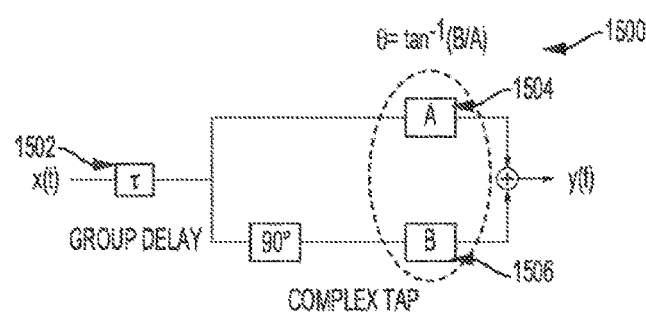
FIG. 15 illustrates a complex tap that may be used to compensate for an envelope delay and a carrier phase shift in accordance with some aspects.

FIG. 12 illustrates a complex tap 1200 that has different in-phase and quadrature phase weights 1202 and 1204 which enable the complex tap 1200 to mimic the complex response of a leakage channel. Further, as shown in FIG. 13, when a modulated signal 1302 passes through a complex channel the modulated signal 1302 undergoes an envelope delay (T) 1304. The modulated signal 1302 with an envelope delay 1304 may be referred to as an envelope delayed signal 1306. FIG. 14 shows that the modulated signal 1302 also undergoes a carrier phase shift (θ) 1402 as well. FIG. 15 illustrates a complex tap 1500 that may be used to compensate for an envelope delay, e.g., the group delay, and a carrier phase shift. A complex tap 1500 may compensate for the envelope delay 1304 using its delay cell 1502 and also compensate for the carrier phase shift 1402 by controlling in-phase and quadrature weights 1504 and 1506, respectively, given by the relation $\theta=\tan^{-1}(B/A)$. Real taps may also be used to mimic the same channel. The number of real taps, however, is greater than the number of complex taps needed to compensate for the envelope delay 1304 and the carrier phase shift 1402.

There are known complex tap-based FIR filters that have been used for self-interference cancellation. The known complex tap-based FIR filters, however, are not suitable for on-chip implementation. For example, some known complex tap-based FIR filters use off-chip co-axial cables as delay cells which makes an on-chip implementation impossible.

Figure 16:
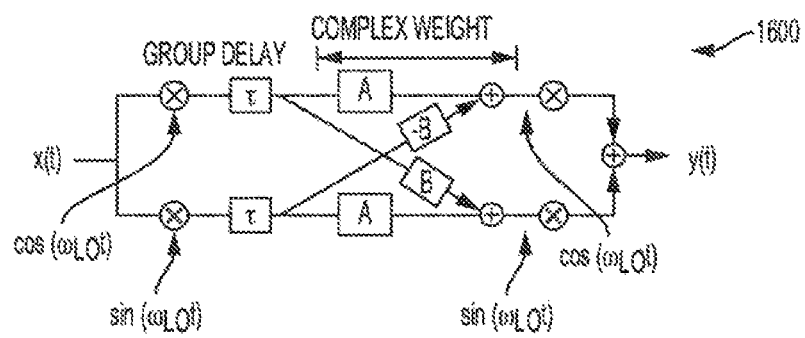
FIG. 16 illustrates a complex tap based finite impulse response (FIR) filter.

In another known complex tap-based FIR filter, the filter may be implemented on-chip but with several disadvantages. FIG. 16 illustrates a complex tap 1600 based FIR filter. The complex tap 1600 is implemented by down-converting to baseband generating I/Q and then using baseband delays and then up-converting to RF. The complex tap 1600 solution is power hungry due to the two frequency translations involved, i.e., up-conversion and down-conversion. There is also noise folding due to the two frequency translations involved which impairs the feedforward cancelling signal with noise and also with non-linearity. Finally, this implementation uses baseband I/Q and therefore, the additional cross-couple weights (−B and B) are needed for complex tap implementation thereby requiring a total of four weights per tap (A, A, −B, B).

Figure 17:
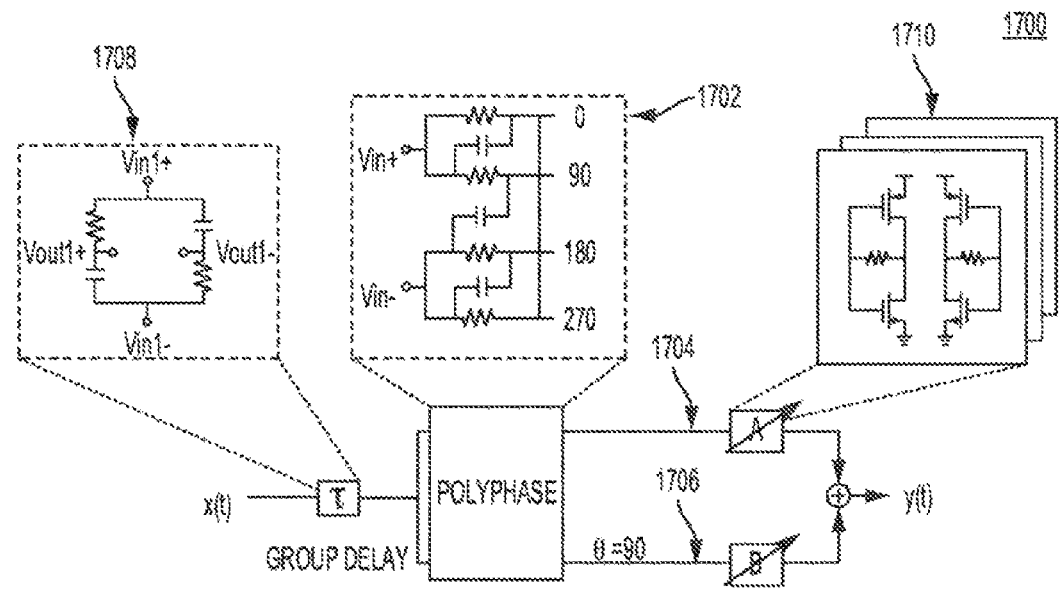
FIG. 17 illustrates a block diagram of a complex tap in accordance with some aspects.
Figure 18:
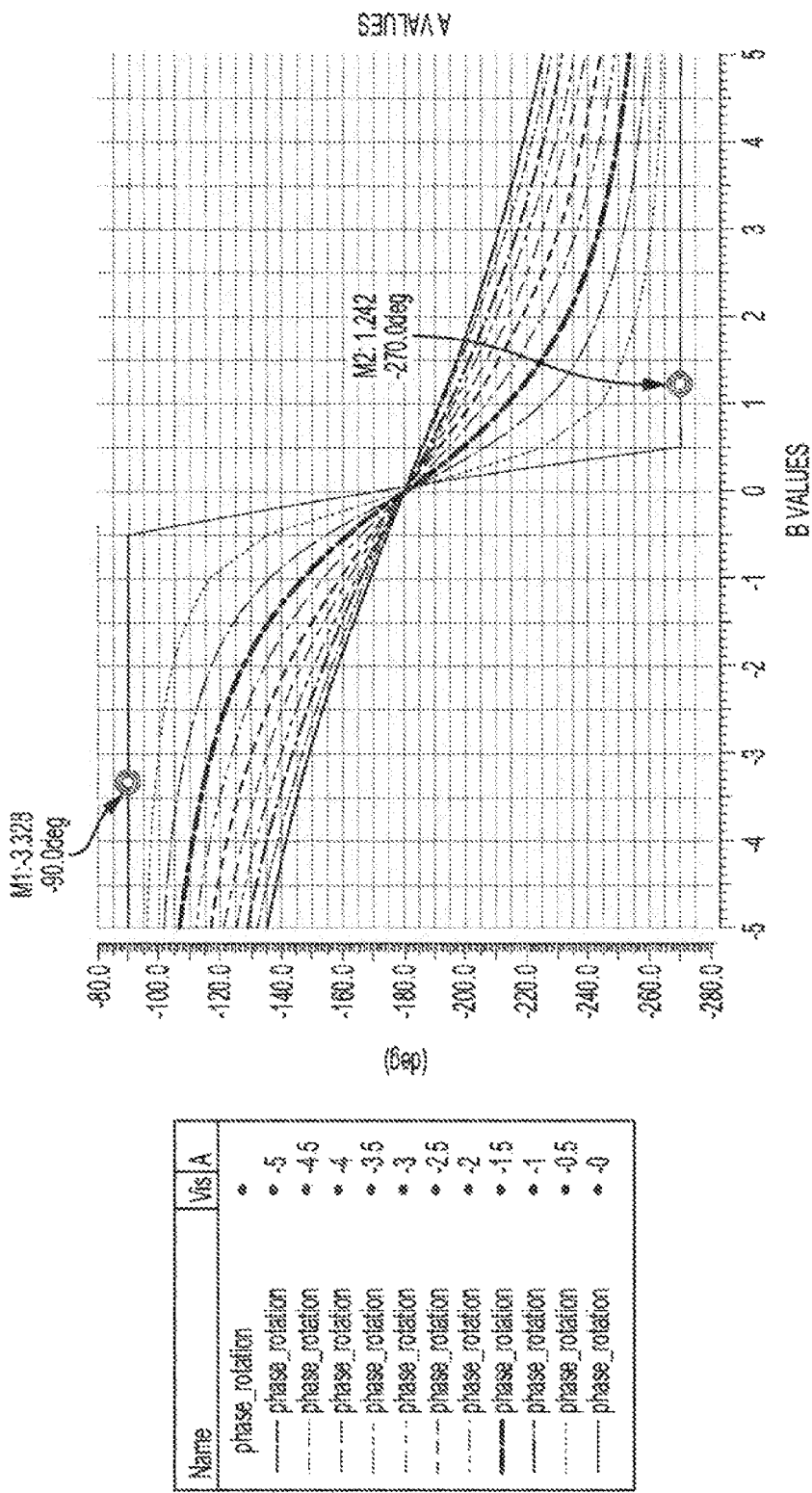
FIG. 18 illustrates simulated phase shifts that may be achieved by varying the weights A and B in accordance with some aspects.

FIG. 17 shows a block diagram of a complex tap 1700. Instead of down-converting to baseband and generating I/Q, the complex tap uses a poly phaser filter 1702 to generate a 0 degree phase shifted signal 1704 and a 90 degree phase shifted signal 1706. These two signals may have the same amplitude and therefore, do not require the cross-couple weights needed in the complex tap 1600. There is also no frequency translation involved and therefore, the complex tap 1700 has a lower power consumption and does not impair the feedforward signal with noise and nonlinearity. The polyphase filter 1702 may be a passive resistor-capacitor (RC) filter. Delay cells 1708 may be implemented using a passive RC-RC based all-pass filters. Weights 1710 may be implemented using a 5-bit inverter based variable gain amplifier (VGA). Being mostly passive, the complex tap 1700 is low power, low noise and highly linear. The weights 1710 may be controlled to mitigate any mismatch and process variation impact. With passive RC components, buffers and independent control on weights, the complex tap 1700 is robust. FIG. 18 illustrates simulated phase shifts that may be achieved by varying the weights A and B in accordance with some aspects.

Figure 19:
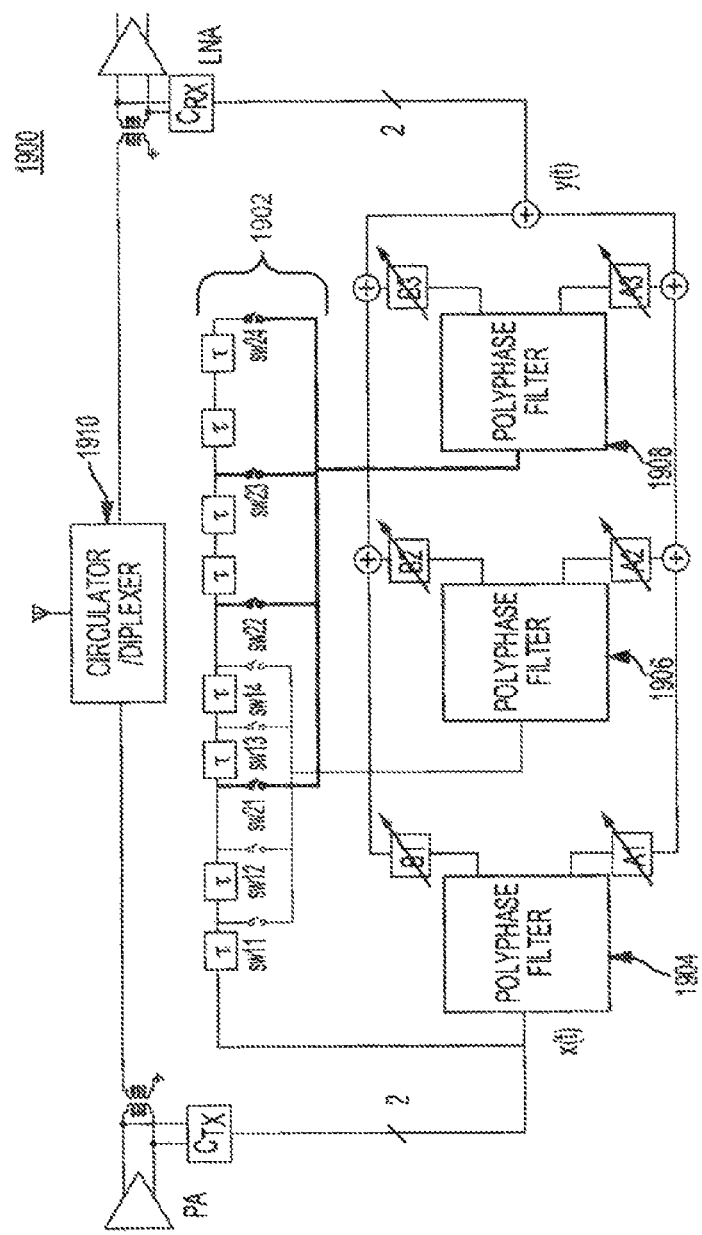
FIG. 19 illustrates an end-to-end block diagram of a RF-RF canceller with three programmable taps in accordance with some aspects.
Figure 20:
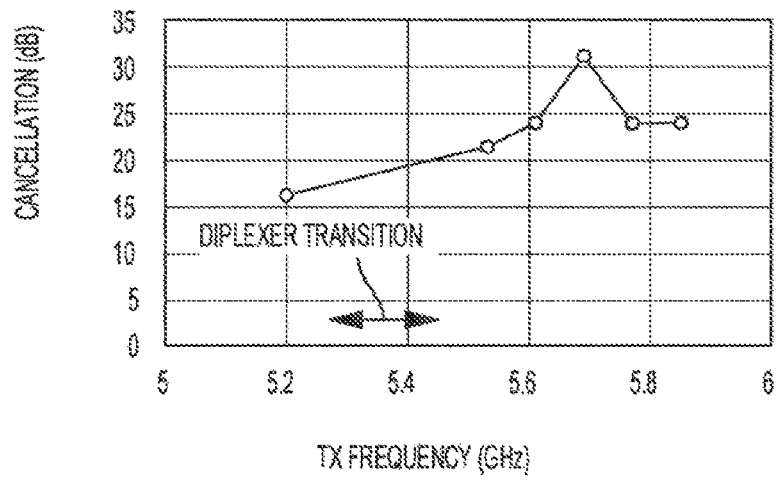
FIG. 20 illustrates cancellation versus transmission frequency of a two-tap FIR in accordance with some aspects.

FIG. 19 illustrates an end to end block diagram of a RF-RF canceller 1900 with three programmable taps in accordance with some aspects. A switch matrix 1902 may be used to control the value of T and number of taps 1904, 1906, and 1908 to adapt with different samples of a diplexer 1910. The RF-RF canceller 1900 may be implemented on silicon. As shown in FIG. 20, a two-tap FIR with a unit delay of 100$p$ s may achieve between 16 dB and 31 dB cancellation over an 80 MHz bandwidth with approximate total power consumption of 22 mA.

Figure 21:
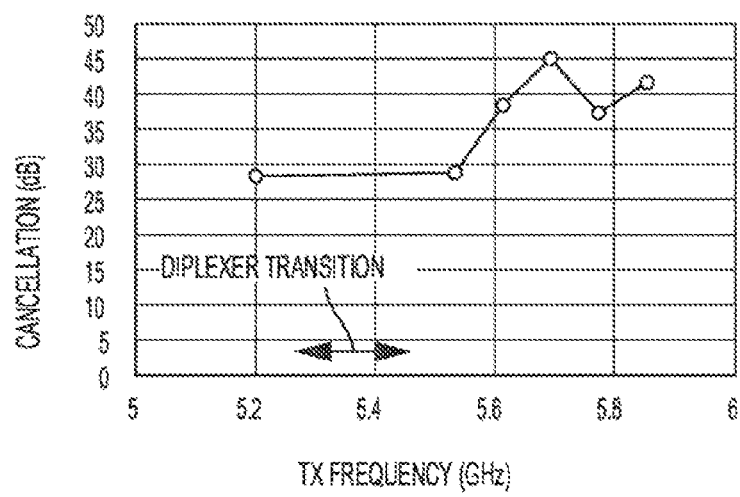
FIG. 21 illustrates cancellation versus transmission frequency of a three-tap FIR in accordance with some aspects.
Figure 22:
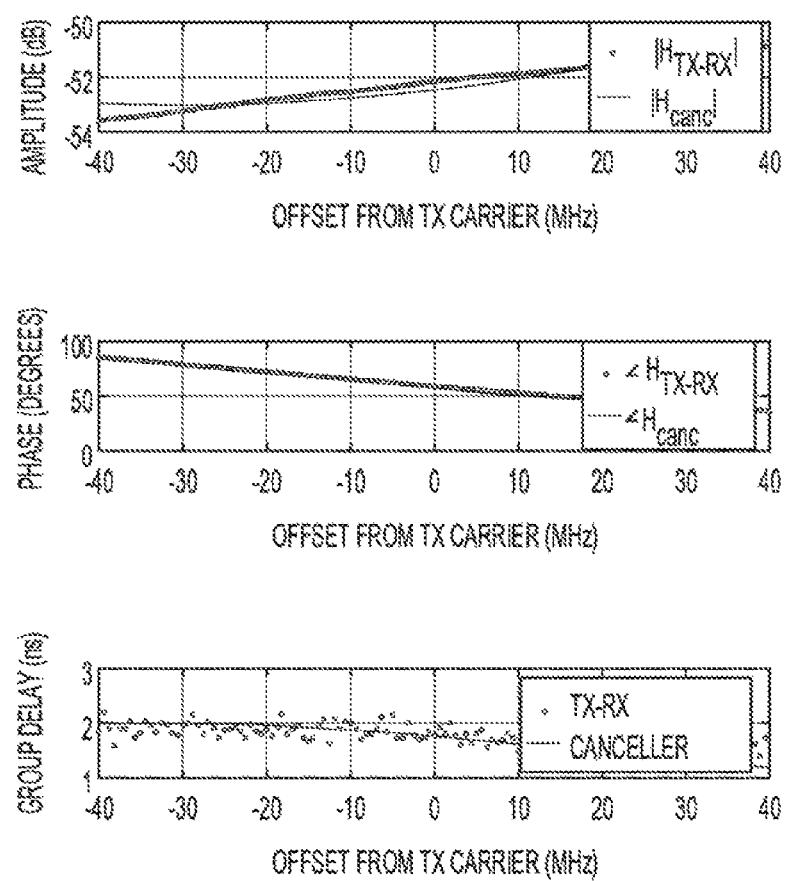
FIG. 22 illustrates the simulated magnitude, phase and group delay response of a channel and canceller at transmission frequency of 5.69 GHz for a two-tap FIR filter in accordance with some aspects.
Figure 23:
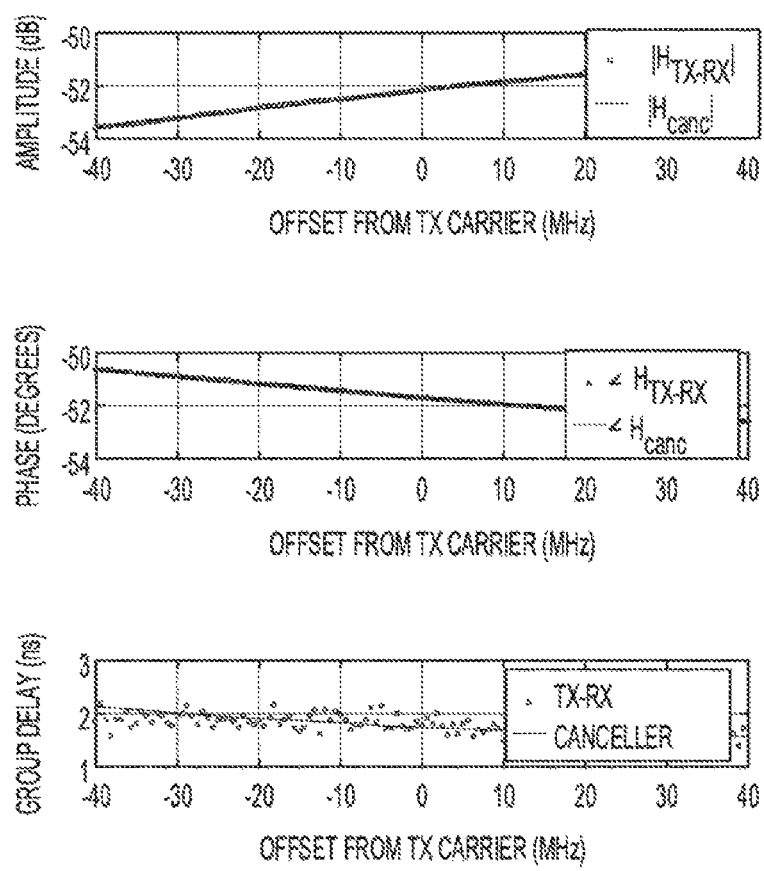
FIG. 23 illustrates the simulated magnitude, phase and group delay response of a channel and canceller at transmission frequency of 5.69 GHz for a three-tap FIR filter in accordance with some aspects.

As shown in FIG. 21, a three-tap FIR with a unit delay of 400 ps may achieve between 28 dB and 45 dB cancellation over an 80 MHz bandwidth with approximate total power consumption of 45 mA. FIG. 22 illustrates the simulated magnitude, phase and group delay response of a channel and canceller at transmission frequency of 5.69 GHz for the two-tap FIR filter in accordance with some aspects. FIG. 23 illustrates the simulated magnitude, phase and group delay response of a channel and canceller at transmission frequency of 5.69 GHz for the three-tap FIR filter in accordance with some aspects.

In an aspect, multiple UEs may be multiplexed together. For example, multiple UEs may be multiplexed together for the purpose of control channel. The UEs may have varying speeds, interference environments, etc., which effectively results in vastly different channel coherence times between the UEs. For example, a static UE with a line-of-sight (LoS)

channel condition has a very high coherence time. As a result, an evolved node B (eNB) may not need to re-beamform towards that UE, assuming UE does not get blocked, and the required beam-width for communication with that UE may be arbitrarily small and for a long duration of time. In contrast, a highly mobile UE, particularly with no line-of-sight (nLoS) channel conditions, would have a very low coherence time. The eNB may have to frequently re-beamform towards that UE for the purpose of data or control traffic. Having to frequently re-beamform may significantly increase the overhead and reduce the overall spectrum utilization.

Various aspects address the problem of how to accommodate channel coherence time and mobility of an UE in the construction of the control channel. For example, if an eNB were to use a higher beam-width for a mobile UE, the control channel can potentially be valid for a longer duration of time, e.g., for the duration of a super frame or until the next sector sweep procedure. In contrast, a narrow beam control channel may quickly fail, resulting in re-instantiating the sector sweep procedure or cell switching which increases the overhead for the UE and the system.

Previous work in this technology area has suggested leveraging multi-directional beams for the purpose of construction of the control channel. Maximum multiplexing and blockage robust control channel have also been discussed. Previous work has suggested a two-tier beamforming design with broad Tier-1 beams used for a control channel and narrow Tier-2 beams for data channels. Tier-1 beams have a very high half power beam-width (HPBW) with low beamforming gain. This helps a Tier-1 beam accommodate UEs with heterogeneous desired HPBWs by being conservative and using a broad beam for all UEs. However, using Tier-1 beams may translate to unnecessary energy transmission even in directions where no UE exists. The unnecessary energy transmission reduces the multiplexing gain and also makes the control channel highly susceptible to blockage. To overcome these problems, prior work has suggested multi-directional beamforming schemes that transmit energy only in directions where UEs reside.

None of the prior work, however, takes the mobility of the UEs and heterogeneity of coherence times into account. Various aspects describe signaling and mechanisms such that the eNB would have an estimate of the UE coherence time and further design a multi-directional beamforming algorithm that explicitly takes the required half power beam-width in the direction of interest into account.

In various aspects, an eNB allows UEs to choose their desired half power beam-widths (HPBWs). In one aspect, the HPBW is chosen for the purpose of control channel. Each UE may use contextual and historical information, e.g., whether the UE is in LoS/nLoS, the approximate location of the UE with respect to the eNB, and current or historical velocity of the UE, to calculate its desired HPBW and sends this information to the eNB. Alternatively, the eNB may receive information from the UE, e.g., historical or current velocity of the UE, etc. and may choose an appropriate HPBW for each UE. Once the eNB has the appropriate HPBW information, the eNB may customize its multi-directional beam pattern for the current group of UEs.

In an aspect, signaling and mechanisms are described such that an eNB acquires information about the desired HPBW of each UE. Either the UE calculates its desired HPBW and sends this information to the eNB, or the UE may provide some indication of its velocity and the eNB calculates the desired HPBW for the UE. Either the information may be sent to the eNB as part of a sector sweep procedure or during each sub-frame in which the UE is scheduled.

In an aspect, a sector sweep procedure allows the eNB to acquire the beam index and the corresponding SNR for transmission to each UE. These beams may be referred to as Tier-2 beams which have high beamforming gain and a narrow HPBW. Using the information from the UEs, an eNB may calculate parameters that may be used for synthesis of a multi-directional control channel beam.

Signaling Between eNB and UE

In various aspects, contextual information from the UE and received by the eNB may be used to derive a desired HPBW for each UE. The derivation may be implemented at the UE or at the eNB. The UE implementation is described first, followed by the eNB implementation.

Figure 24:
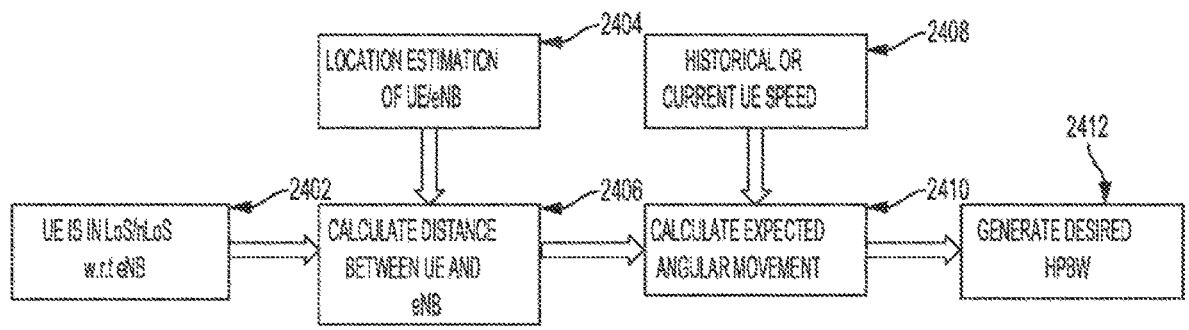
FIG. 24 illustrates steps for deriving a desired half power beam-width for a UE in accordance with some aspects.

FIG. 24 illustrates steps for deriving a desired half power beam-width for a UE in accordance with some aspects. At 2402, a UE determines if the UE is in LoS/nLoS with respect to a eNB. At 2404, the UE determines an estimated location of the UE and the eNB. At 2406, a UE calculates an approximate distance between the UE and the eNB. In an aspect, the UE uses contextual information such as whether the UE is in LoS/nLoS and a location of the UE and the eNB to approximate the distance. In an aspect, the eNB may provide its geolocation information to the UEs via radio resource control (RRC) or a broadcast such as a master information block (MIB) or a system information block (SIB). The geolocation information may be used by the UEs to calculate the distance more accurately.

If the channel is LoS, the distance may be the 3D geographical distance between the UE and the eNB. When channel is nLoS, the signal bounces off of obstacles before it reaches the UE. Therefore, to approximate the distance, the UE may multiply the LoS distance with a scaling factor. The scaling factor is greater than one since the nLoS distance is larger than the LoS distance.

At 2410, the UE calculates an approximate expected angular movement from the perspective of the eNB. In an aspect, the UE may use the calculated approximate distance from 2406, current or historical UE speed or velocity 2408, direction of travel with respect to directional of arrival, and expected time duration until next sector sweep to calculate an approximate angular movement.

Figure 25:
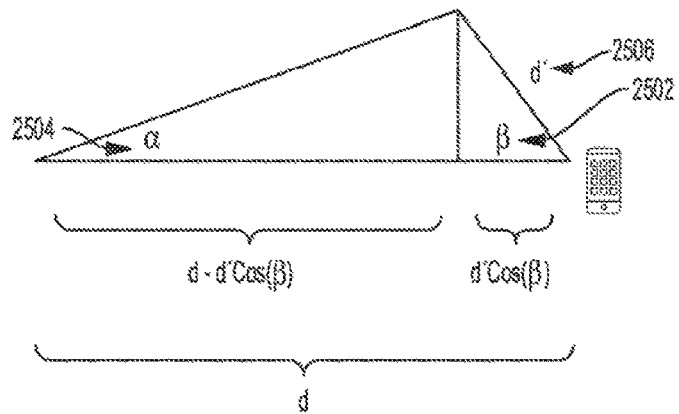
FIG. 25 illustrates derivation of angular movement in accordance with some aspects.

The UE may use known techniques to calculate the direction of arrival (DoA). The UE may also use historical location information, or leverage sensors on the UE to calculate the direction of travel (DoT) with respect to the DoA. FIG. 25 illustrates derivation of angular movement. Let β 2502 be the angle between DoT and DoA. Alternatively, the UE may be conservative and assume that β=π/2−α, which results in maximum α 2504.

Next, with the known UE speed and the time duration until next sector sweep, the UE may calculate its expected physical movement 2506 as d'=v×t, where v is the velocity of the UE and t is the sector sweep interval.

From FIG. 25 the angular movement (α) 2504 may be calculated $$\alpha = \tan^{-1}\left(\frac{\sqrt{d'^2 - (d'\cos(\beta))^2}}{d - d'\cos(\beta)}\right).$$

At 2412 in FIG. 24, the UE may select an appropriate HPBW.

Various aspects may use one of two mechanisms to select an appropriate HPBW. In one aspect, the UE explicitly declares to the eNB its desired HPBW (a). In an alternative aspect, the eNB quantizes the desired HPBW. The eNB may send the desired HPBW as part of Master Information Block (MIB) or other system information which may be transmitted through a Broadcast Control Channel (BCH). For example, an eNB may have four possible HPBWs corresponding to 1^, 5^, 10^, 15^. In this case, the UE may send two bits of information corresponding to the desired HPBW. In general, an eNB may have $M=2^{(N)}$ thresholds, in which case the UE may send the N bits corresponding to the UE's desired HPBW. In an aspect, the UE may choose the threshold that is higher than the UE's calculated HPBW. If the calculated HPBW is higher than the maximum threshold, the UE may choose the maximum possible HPBW.

In another aspect, the eNB may derive the appropriate HPBW for each UE. Similar operations from FIG. 24 may be used. The UE may derive the angular difference between DoA and DoT ($\beta$) and sends this along with the velocity to the eNB. In addition, the UE may provide its current geolocation information so that eNB can more accurately calculate the distance. Alternatively, the UE may only send the derived p value and the eNB uses historical UE location information to derive the UE's speed.

Adaptive Beam-Width Control Channel Design

Based on the HPBW, a multi-directional beam pattern with adjustable beam-width may be designed to serve the UEs. In an aspect, a hybrid antenna architecture in which each RF chain is connected to an array of antennas may be used. A phase shifter may be connected to each antenna. By appropriately adjusting the phase shift on each antenna, a desired beam pattern with different number of beams, power gain and beam width may be achieved.

In an aspect, an eNB wants to form a multi-directional beam towards B different UEs. From a sector sweep, the eNB has information about the Tier-2 beam index for each of the B UEs and the corresponding SNR. Since Tier-2 beams may be very narrow, each Tier-2 beam corresponds to an elevation and Azimuth angle (Theta, Phi). Thus, if the eNB used a beamformer w, the resulting SNR at the UE, assuming the eNB transmission power does not change, would be approximately equal to:

$SNR$(Tier-2)−(BFming-gain-Tier-2-$k$(Theta,$Phi$)−Bfming-Sin-$w$(Theta,$Phi$))

Control channel information may be sent at a fixed modulation and coding scheme and hence may need a minimum SNR to be correctly decoded at the UE. Let SNR(Base) denote the minimum required SNR at the UE. From the resulting SNR formula above, the maximum beamforming gain loss that the UE may tolerate and still correctly decode the control channel would be (SNR(Tier-2)−SNR(Base)). In an aspect, the eNB may be more conservative and add a margin to account for inaccuracies. Now define the minimum beamforming gain of a UE with Tier-2 index k as:

$p_i$=BFming-gain(Tier-2($k$))−(SNR(Tier-2($k$))@$UE(i)$−SNR(Base)).

Using the minimum beamforming gains, a vector of beamforming gains across UEs may be defined as $p=p_c[p_1, \ldots, p_B]$, where $p_c \geq 1$ is a scaling factor to construct a feasible beam pattern, and $p_i$, i=1, ..., B is the minimum beamforming used to establish a control channel for UE/beam i. In addition, the beam width of beams is given in a vector $f=[f_1, \ldots, f_B]$, where $f_i$ is beam width of beam i.

If beam broadening is not needed for a beam, then $f_i$=0. Beam direction may also be defined as vector $\theta=[\theta_1, \ldots, \theta_B]$, where $\theta_i$ is direction of beam i. The number of antennas may be represented as N.

Then, a set of constraint points around the angle $\theta_i$ with beam width $f_i$, i=1, ..., B may be formed as follows:

$$\varphi_i = \left[\theta_i - \frac{f_i}{2}, \; \theta_i + \frac{f_i}{2}\right], i = 1, \ldots, B.$$

Figure 26:
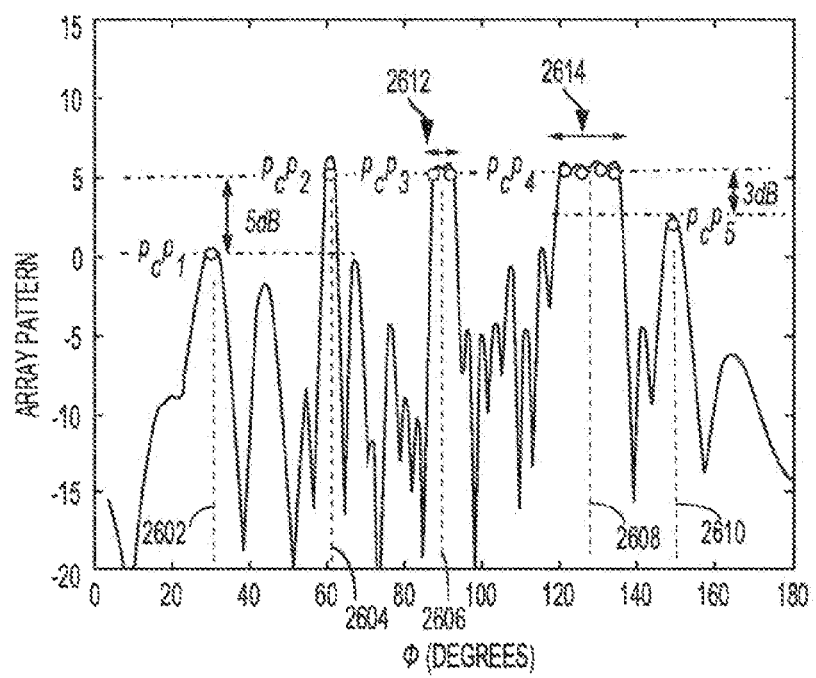
FIG. 26 illustrates constraint points and a resulting pattern for five beams in accordance with some aspects.

The corresponding constraint matrix may be given as: $A_i=$ $$\begin{bmatrix} a_i^T(\phi_{i,1}) \\ \vdots \\ a_i^T(\phi_{i,K}) \end{bmatrix},$$

where $\phi_i \in \varphi_i$ are the sample points from the set $\varphi_i$ and $a_i^T(\phi_1)=[1, e^{i\pi \cos \phi_1}, \ldots, e^{i\pi(N-1)\cos \phi_1}]$. FIG. 26 illustrates constraint points and a resulting patterns for five beams in accordance with some aspects. The direction of the five beams are indicated as $\theta_i$ 2602, 2604, 2606, 2608, and 2610. Beam widths 2612 and 2614 of two of the beams are broadened compared to beam widths of the other three beams. In this exemplary aspect, the beam width 2614 is greater than 15 degrees wide, e.g., 20 degrees wide.

Figure 27:
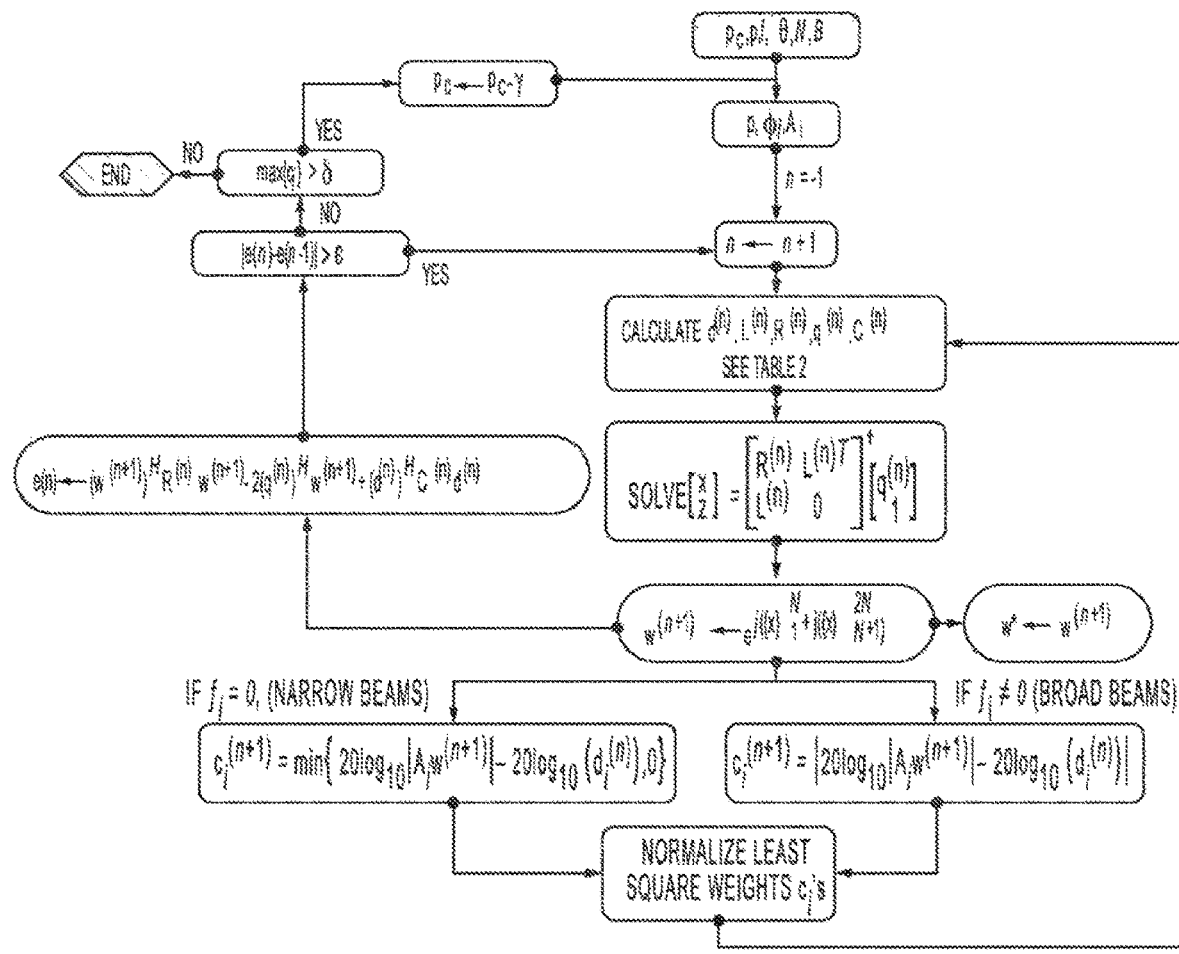
FIG. 27 illustrates an algorithm that returns an optimal beamforming vector w* in accordance with some aspects.

FIG. 27 illustrates an algorithm that returns an optimal beamforming vector w*. In one aspect, the algorithm uses the equations in Table 2.

TABLE 2

$$L^{(n)}(i,j) = \begin{cases} \cos(\arg w_k^{(n)}), i = j = k \\ \sin(\arg w_k^{(n)}), i = k, j = k+N \\ 0, \text{otherwise} \end{cases}$$

$$R^{(n)} = \begin{bmatrix} \text{Re}\{AC^{(n)}A^H\} & -\text{Im}\{AC^{(n)}A^H\} \\ \text{Im}\{AC^{(n)}A^H\} & \text{Re}\{AC^{(n)}A^H\} \end{bmatrix}$$

$q^{(n)} = [\text{Re}\{AC^{(n)}d^{(n)}\}\text{Im}\{AC^{(n)}d^{(n)}\}]^T$
$C^{(n)} = \text{diag}(c_i\text{'s})$
$A = [A_1, \ldots, A_B]$ Another aspect addresses the problem of designing a codebook in mmWave bands that helps with realizing simple full duplex transceivers and radio architectures. Full duplex refers to simultaneous transmission and reception on the same frequency band. In particular, a codebook may be designed that simultaneously achieves two objectives: (i) the codebook scans a desired area in Azimuth and elevation, maximizing beamforming gain in specific directions in the coverage area, and (ii) codebook minimizes the energy in the direction of a line-of-sight (LoS) component between transmit and receive antenna arrays or beams. The later helps with realizing a low cost full duplex radio architecture. There are currently no other solutions to design full duplex mmWave radios or code-books.

mmWave radio heads are based on analog beamforming in which each antenna element is connected to a phase shifter, and an array of antennas are derived through an RF chain. The phase and amplitude of each antenna element may be modified through adaptation of the phase shifter and in some implementations adjustment of the RF gain/power amplifier. In one aspect, a codebook design leverages these coarse degrees of freedom to generate codes that maximize beamforming gain in specific directions while minimizing interference in the direction of a LoS component. The above RF domain beamforming cancellation removes a majority of the LoS interference. The residual interference may then be removed in the digital domain, allowing for realization of low cost full duplex transceivers.

In one aspect, a design of a full duplex codebook and radio transceiver specifically for mmWave bands is described. There may be several benefits to enabling full duplex in mmWave bands as opposed to lower frequency bands. For example, there is a larger amount of spectrum which translates to a significantly higher peak data rates. In addition, mmWave systems are essentially noise limited as opposed to lower frequency systems which are interference limited. This makes managing interference in multi-cell mmWave networks easier as opposed to lower frequency bands. Antenna size and cost may also drastically drop in mmWave bands. This makes using RF cancellation techniques that leverage a higher number of antennas easier in mmWave systems.

mmWave bands are currently being considered for next generation of cellular and WiFi standards. In order to compensate for the high path loss associated with higher frequencies, beamforming with large antenna arrays is required. To have the highest beamforming pin, discrete Fourier transform (DFT) based codebooks may be considered. Although a DFT codebook provides the best beamforming gin, a DFT codebook also has large side lobes which may create high interference. Therefore, DFT-based codebooks may not be appropriate for full duplex mmWave transceivers. In one aspect, a novel method to design beamforming codebooks that have minimal interference to adjacent receiver antenna array is proposed.

For ease of presentation, the transmit (Tx) and receive (Rx) chains may be connected to different antenna arrays. Having separate transmit and antenna arrays further reduces the self-interference due to path loss. Further, since mmWave antenna arrays are much smaller than RF antennas, this makes the solution attractive to mmWave bands. In another aspect a codebook design is applicable to a mmWave radio architecture in which each antenna element is connected to both the Rx and the Tx RF chains with a mmWave circulator.

Codebook Design for a Single Panel Full Duplex mmWave Transceiver.

Figure 28:
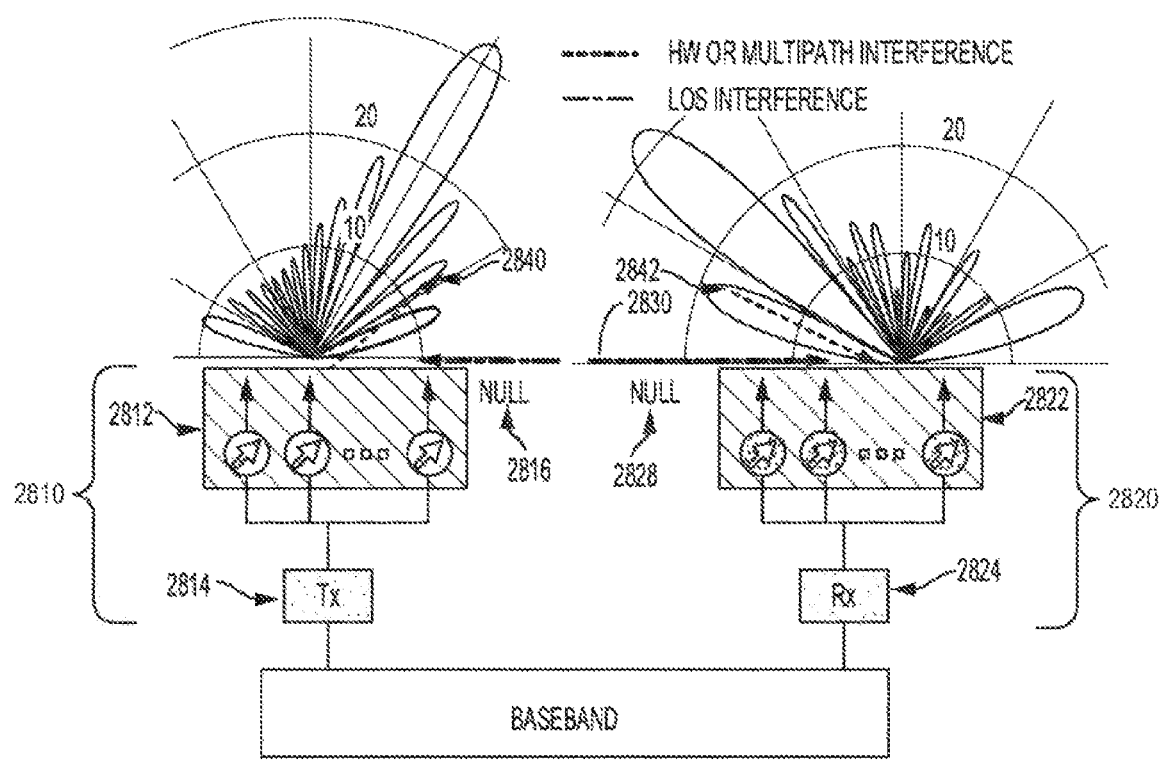
FIG. 28 illustrates a single linear antenna array for each of a transmitter chain and a receiver chain in accordance with some aspects.

FIG. 28 illustrates a single linear antenna array 2812 for a transmitter chain 2810 and a single linear antenna array 2822 for a receiver chain 2820. Without loss of generality, consider a uniform linear array with N antennas. A main interference 2830 is directional line-of-sight (LOS) interference from a transmitter 2814 to a receiver 2824. In order to reduce the interference 2830, a null 2816 is placed to the beam pattern of the transmitter 2814 towards the LOS direction of receiver 2824. Similarly, another null 2828 is placed to the beam pattern of the receiver 2824 from the LOS direction of the transmitter 2814. Note that the LOS interference is very strong and high interference rejection may be used to combat the LOS interference.

In addition, additional interference 2840 and 2842 may be observed from different directions due to hardware (HW) impairments and/or some multipath reflections at the receiver. In this case, the received interference level may not be as strong as the LOS interference 2830, but the additional interference 2840 and 2842 may have a significant impact on performance. In one aspect, an extra notch is placed to the beam patterns to reduce the additional interference. As stated above, the level of the notch may be different than the level of the LOS null since the reflections and interference from HW or reflection may be different and may be much lower than the LOS interference.

In an aspect, a codebook may be designed to for a single panel of a full duplex mmWave transceiver. Let the phase excitation of antennas be denoted by $[w_0, w_1, \ldots, w_{N-1}]^T$, where $|w_n|=1$, $n=0, \ldots, N-1$ and N is the total number of antennas for each panel. Below is a DFT matrix that may be used to define constraint points at the array pattern:

$$A \in \mathbb{C}^{NO \times N} = \begin{bmatrix} a_1^T \\ \vdots \\ a_k^T \\ \vdots \\ a_{NO}^T \end{bmatrix} = \begin{bmatrix} 1 & e^{j\frac{2\pi}{NO}} & \ldots & e^{j\frac{2\pi(N-1)}{NO}} \\ \vdots & \vdots & \vdots & \vdots \\ 1 & e^{j\frac{2\pi k}{NO}} & \ldots & e^{j\frac{2\pi(N-1)k}{NO}} \\ \vdots & \vdots & \vdots & \vdots \\ 1 & e^{j\frac{2\pi NO}{NO}} & \ldots & e^{j\frac{2\pi(N-1)NO}{NO}} \end{bmatrix}$$

where O is oversampling ratio, and $$a_k^T = \left[1, e^{j\frac{2\pi k}{NO}}, \ldots, e^{j\frac{2\pi(N-1)k}{NO}}\right].$$

Here, the DFT codebook index k corresponding to desired steering angle $\theta_d$ by $$k_d = \left\lfloor \frac{NO}{\lambda} d_a \cos(\theta_d) \right\rfloor.$$

Here $\lfloor \cdot \rfloor$ is an operator to find closest integer, $d_a$ is the inter-element distance for a uniform linear array in terms of wavelength $\lambda$.

Then, the far field radiation pattern at azimuth angle $\theta_k$, may be found, e.g., $a_k^T$, by $d(\theta_k) = a_k^T w$. The azimuth angle $\theta_m$ may be defined as the location of the main beam, azimuth angle $\theta_n$ as where there is a null, and a set of azimuth angles for side lobes $\theta_s$ to constrain side lobe levels below a certain threshold. Note that these angles are defined by the DFT indexes of matrix A. For the case when transmit and receive antenna arrays are placed next to each other, the null locations are 180° and 0°.

Figure 29:
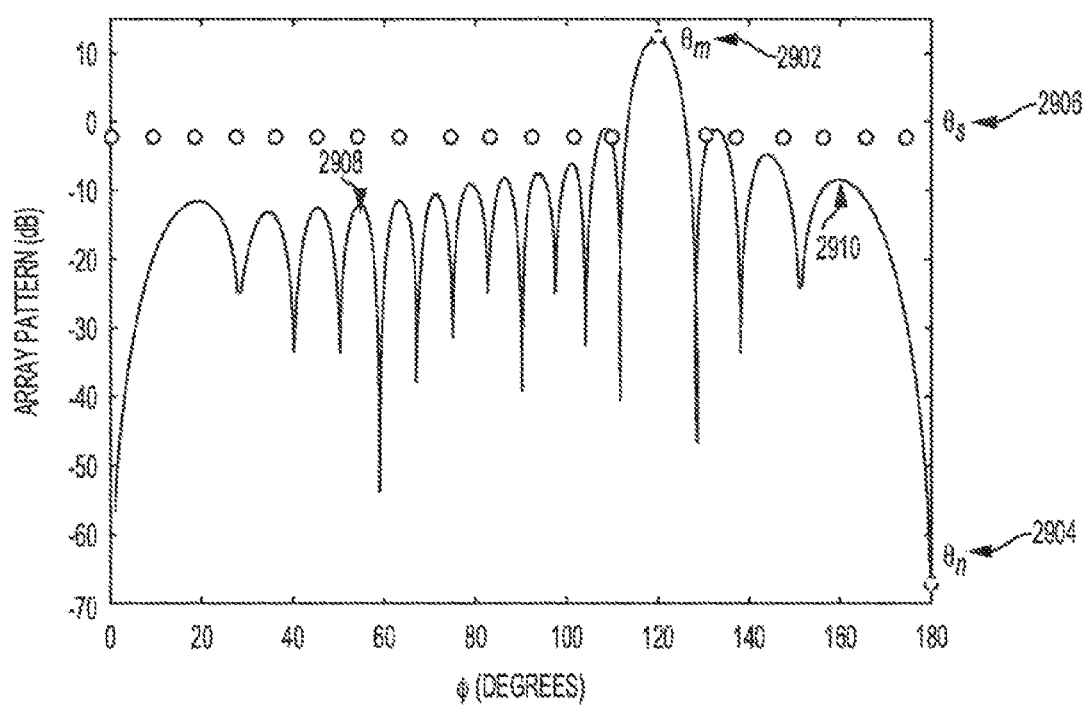
FIG. 29 illustrates example constraint points for a full duplex codebook in accordance with some aspects.

FIG. 29 illustrates example constraint points for a full duplex codebook in accordance with some aspects. An azimuth angles 2902 is shown near 120, and a null 2904 is shown at 180°. In addition, all side lobes, such as 2908 and 2910, are below a set of azimuth angles 2906.

In an aspect, a codebook which minimizes the interference to each Tx/Rx antenna array is designed. The least square error minimization problem may be used to have a minimum error between desired pattern and achieved pattern at the given constraints. Using this optimization problem, a phase only codebook may be designed which reduces self-interference. An algorithm is given below in TABLE 3.

TABLE 3

Algorithm for phase-only codebook for full duplex mm Wave array:
Input: Total number of antennas N, $\theta_m$, $\theta_n$, and $\theta_s = [\theta_{s,1}, \ldots, \theta_{s,S}]$, the main beam gain $d_m = \sqrt{N}$, the gain at null $d_n$, the maximum side lobe level $d_s = [d_{s,1}, \ldots, d_{s,S}]$, $w^{(0)} \in \mathbb{C}^{N \times 1}$ initial phase values (arbitrary), least square weights $C^{(b)}$, $e(0) = \infty$, $A_l \leftarrow$
$[a(\theta_m), a(\theta_n), a(\theta_{s,1}), \ldots, a(\theta_{s,S})]$
do{

$$d^{(n)} = \begin{bmatrix} d_m e^{j\arg(a^H(\theta_m)w^{(n)})}, d_n e^{j\arg(a^H(\theta_n)w^{(n)})}, d_{s,1} e^{j\arg(a^H(\theta_{s,1})w^{(n)})}, \\ \ldots, d_{s,S} e^{j\arg(a^H(\theta_{s,S})w^{(n)})} \end{bmatrix}^T,$$

TABLE 3-continued $$L^{(n)}(i,j) = \begin{cases} \cos(\arg w_k^{(n)}), i=j=k \\ \sin(\arg w_k^{(n)}), i=k, j=k+N \\ 0, \text{otherwise} \end{cases};$$

$$R^{(n)} = \begin{bmatrix} \text{Re}\{A_l C^{(n)} A_l^H\} & -\text{Im}\{A_l C^{(n)} A_l^H\} \\ \text{Im}\{A_l C^{(n)} A_l^H\} & \text{Re}\{A_l C^{(n)} A_l^H\} \end{bmatrix}$$

$$Q_{s,l}^{(n)} = \begin{bmatrix} \text{Re}\{a(\theta_{s,l})a^H(\theta_{s,l})\} & -\text{Im}\{a(\theta_{s,l})a^H(\theta_{s,l})\} \\ \text{Im}\{a(\theta_{s,l})a^H(\theta_{s,l})\} & \text{Re}\{a(\theta_{s,l})a^H(\theta_{s,l})\} \end{bmatrix}, l=1,\ldots,|\theta_s|$$

$$q^{(n)} = [\text{Re}\{A_l C^{(n)} d^{(n)}\} \text{Im}\{A_l C^{(n)} d^{(n)}\}]^T$$

$$x^{(n)} = \arg\min_x d^{(n)H} C^{(n)} d^{(n)} + x^{(n)H} R_r x - 2x^H q_r$$

s.t. $L^{(n)} x = 1$, $\left\| \sqrt{Q_{s,l}^{(n)}} x \right\|_2 \le \sqrt{P_l}, l=1,\ldots,|\theta_s|$ $w^{(n+1)} = e^{j([x]_1^N + j[x]_{N+1}^{2N})}$, update $C^{(n+1)}$ $e(n+1) \leftarrow (w^{(n+1)})^H R^{(n)} w^{(n+1)} - 2(q^{(n)})^H w^{(n+1)} + (d^{(n)})^H C^{(n)} d^{(n)}$ } while {|e(n+1) − e(n)| > ε}

Figure 30:
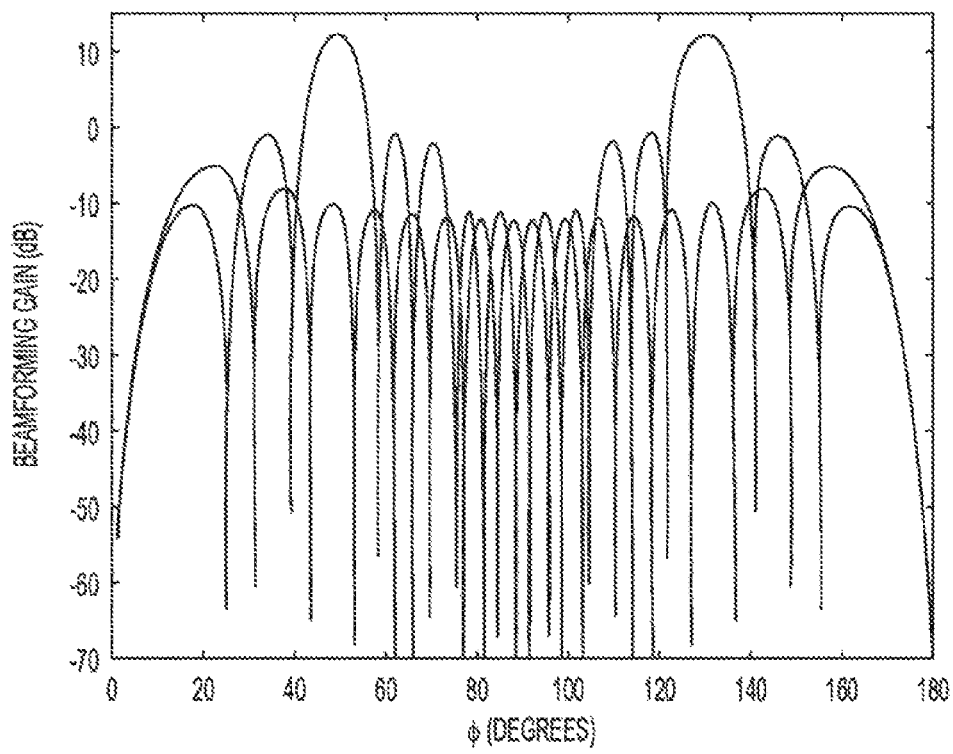
FIG. 30 illustrates example beamforming patterns generated by aspects for steering angles of 50 and 130 degrees in accordance with some aspects.
Figure 31:
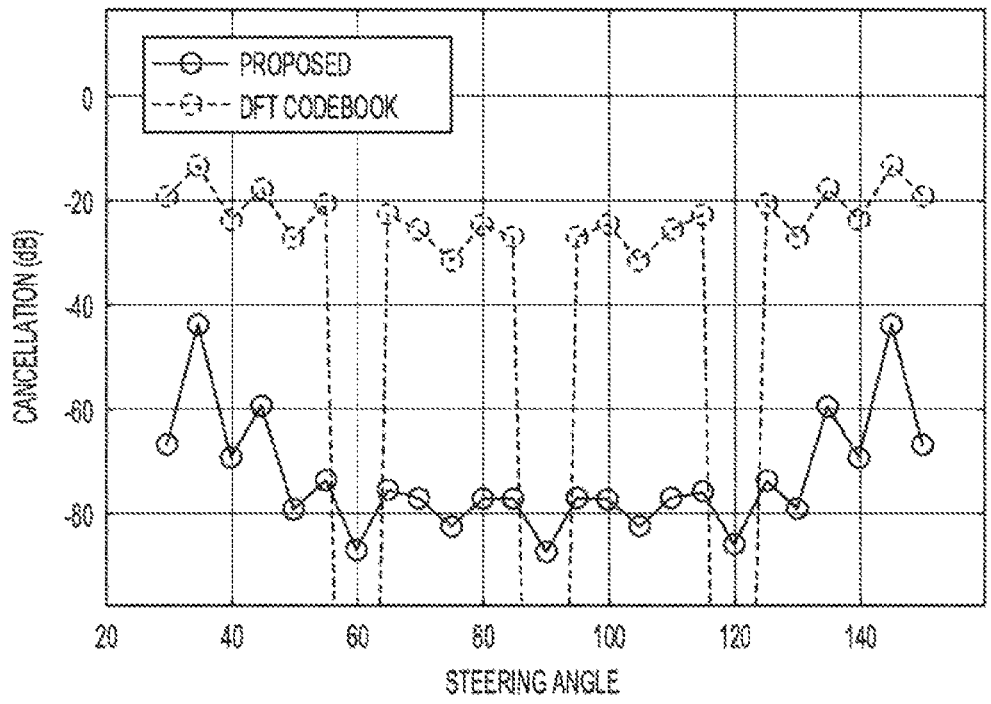
FIG. 31 illustrates a performance comparison between a discrete Fourier transform (DFT) codebook and a codebook based on disclosed aspects.

In an aspect, an example codebook for N=16 antennas which places a null at the direction of 180° may be designed and evaluated. The side lobe levels may be set to beat least approximately 13 dB below the main beam as in a DFT codebook. FIG. 30 illustrates example beamforming patterns generated by aspects for steering angles of 50 and 130 degrees. As seen in FIG. 30, a deep null has been placed at 180 degrees. FIG. 31 illustrates a performance comparison between a DFT codebook and a codebook based on disclosed aspects. FIG. 31 plots the level of cancellation (in dB) at 180 degrees as a function of codebook angle for both the DFT and the proposed codebooks. As shown in the FIG. 31, the codebook generated by certain described aspects has significant interference cancellation capability.

Figure 32:
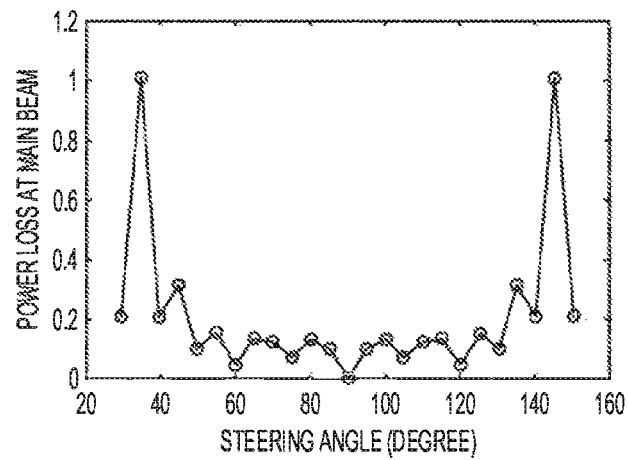
FIG. 32 plots power loss at a main beam as compared to a DFT codebook in accordance with some aspects.

The impact of interference cancellation at 180 degrees on the beamforming gain in the desired look angle may be verified. For example, the level of beamforming gin loss may be calculated as a function of desired look angle compared to the DFT codebook. FIG. 32 plots power loss at a main beam as compared to a DFT codebook. In the plotted example, the maximum main power loss is at 35 degrees and 145 degrees.

Codebook Design for a Multi-Panel (Multi-User) Full Duplex mmWave Transceiver.

Figure 33:
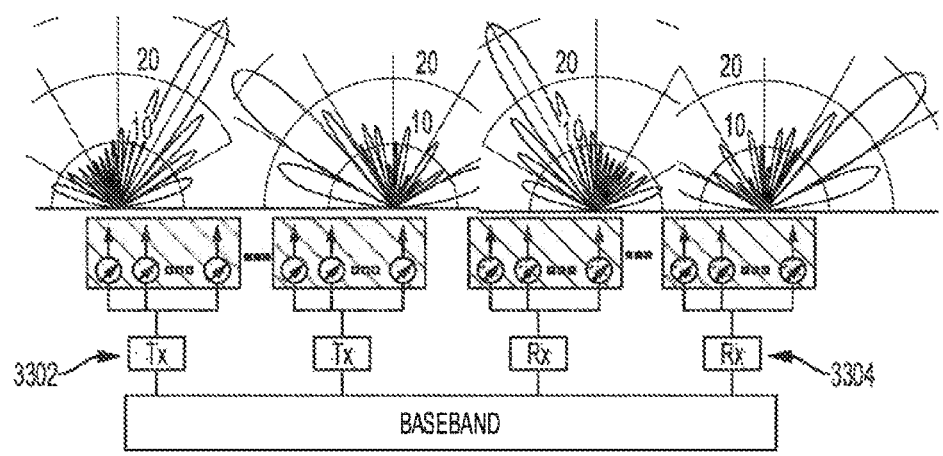
FIG. 33 illustrates an antenna array structure for a mmWave full-duplex transceiver in accordance with some aspects.
Figure 34:
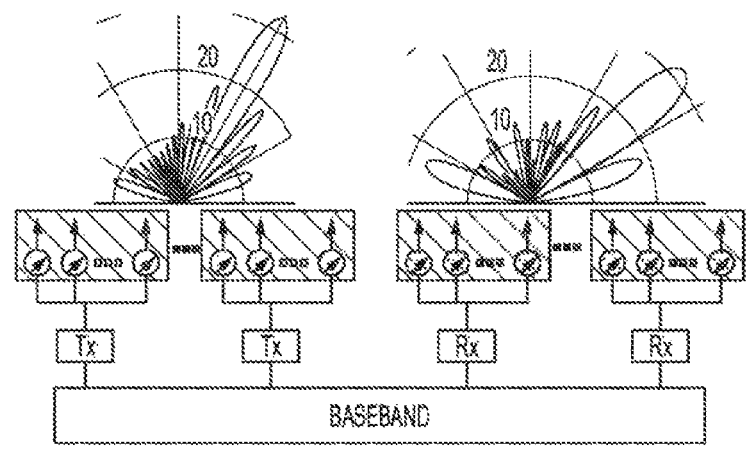
FIG. 34 illustrates an antenna array structure for a mmWave full-duplex transceiver in accordance with some aspects.

FIG. 33 illustrates an antenna array structure for a mmWave full-duplex transceiver in accordance with some aspects. In FIG. 33, each panel serves a single user. Accordingly, a single user is served by transmitter 3302 and receiver 3304. Alternatively, multiple panels may be used for a single user. FIG. 34 illustrates an antenna array structure for a mmWave full-duplex transceiver in accordance with some aspects. In FIG. 34, multiple panels may be used to serve a single user. The amplitude and phase of each panel may be adjusted using the TX RF chain to further reduce interference.

Figure 35:
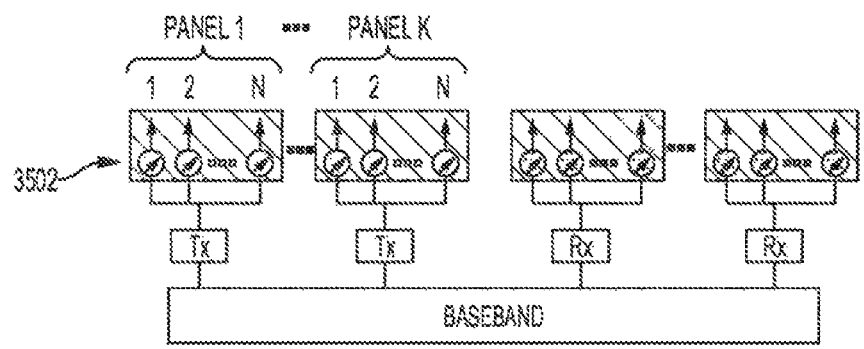
FIG. 35 illustrates an example antenna array structure for designing a codebook in accordance with some aspects.

To design a codebook for a multi-panel and multi-user full duplex mmWave transceiver an antenna array architecture and nomenclature are useful. FIG. 35 illustrates an example antenna array structure for designing a codebook. Each panel, such as 3502, has N antennas and there is a total of K panels at the transmitter. In one aspect, the main beam direction is $\theta_m$. The steering vector may be given by the following $\alpha(\theta_m)=[1, e^{j\pi \cos(\theta_m)}, \ldots, e^{j\pi(N-1)\cos(\theta_m)}]^T$.

Similarly, the null steering vector may be $\alpha(\theta_n) = [1, e^{j\pi \cos(\theta_n)}, \ldots, e^{j\pi(N-1)\cos(\theta_n)}]^T$.

Figure 36:
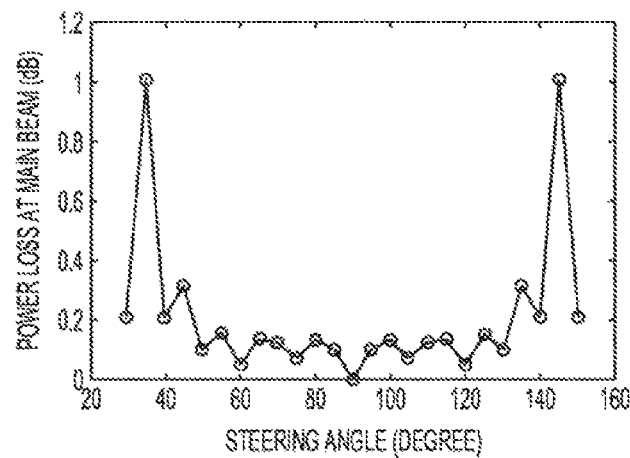
FIG. 36 illustrates performance of a codebook design for a multi-panel full duplex mmWave transceiver in accordance with some aspects.
Figure 37:
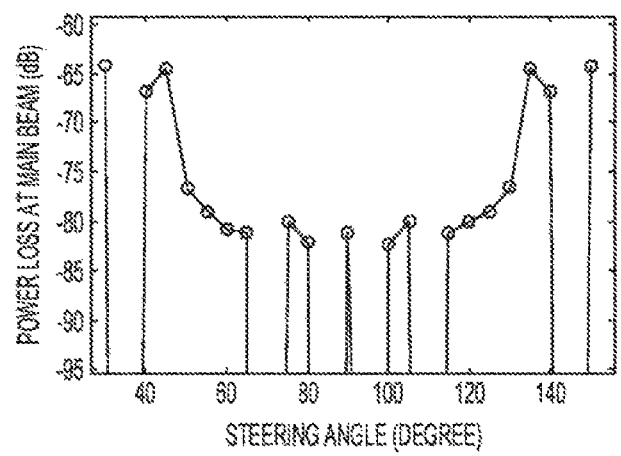
FIG. 37 illustrates performance of a codebook design for a multi-panel full duplex mmWave transceiver in accordance with some aspects.

Then, w an approximate zero forcing vector may be found as follows:

$$H = \left( \begin{bmatrix} 1 \\ e^{j\pi N \cos(\theta_m)} \\ \vdots \\ e^{j\pi(K-1)\cos(\theta_m)} \end{bmatrix} \otimes \begin{bmatrix} a^T(\theta_m)w \\ a^T(\theta_n)w \end{bmatrix}^T \right)^\dagger$$

Where $\otimes$ is a Kronecker product, $(\cdot)^\dagger$ is a pseudo-invers, and w is a codeword obtained from the codebook design for a single panel full duplex mmWave transceiver. The digital excitation vector may then be obtained from first column of H. FIG. 36 and FIG. 37 illustrate the performance of this aspect. The performance of nulling may be improved by using multiple subarray s as shown in FIG. 37.

In another aspect, a zero forcing is applied at the digital baseband. Although this method results in a codebook with low interference, it has highest loss at the main beam and high side lobes. Consider the main beam direction is $\theta_m$. Then the steering vector may be given by the following $\alpha(m)=[1,e^{j\pi \cos(\theta_m)}, \ldots, e^{j\pi(KN-1)\cos(\theta_m)}]^T$.

Similarly, the null steering vector may be $\alpha(\theta_n) = [1,e^{j\pi \cos(\theta_n)}, \ldots, e^{j\pi(KN-1)\cos(\theta_n)}]^T$.

Then, the zero forcing vector may be found as follows:

$$H = \left( \begin{bmatrix} a^T(\theta_m) \\ a^T(\theta_n) \end{bmatrix} (I_K \otimes w) \right)^\dagger$$

Where (is a Kronecker product, $(\cdot)^\dagger$ is a pseudo-invers, and W is codeword obtained from the codebook design for a single panel full duplex mmWave transceiver described above. Then, the digital excitation vector may be obtained from first column of H.

Figure 38:
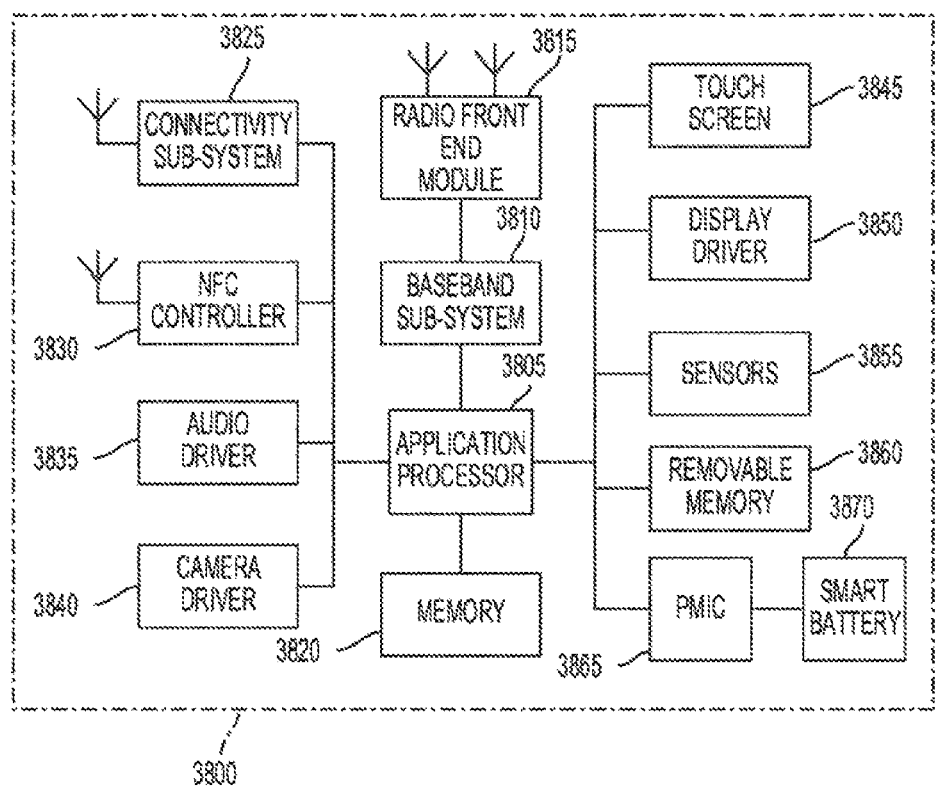
FIG. 38 illustrates a user device in accordance with an aspect.

FIG. 38 illustrates a user device 3800 in accordance with an aspect. The user device 3800 may be a mobile device in some aspects and includes an application processor 3805, baseband processor 3810 (also referred to as a baseband sub-system), radio front end module (RFEM) 3815, memory 3820, connectivity sub-system 3825, near field communication (NFC) controller 3830, audio driver 3835, camera driver 3840, touch screen 3845, display driver 3850, sensors 3855, removable memory 3860, power management integrated circuit (PMIC) 3865 and smart battery 3870.

In some aspects, application processor 3805 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 3810 may be implemented, for example, as a solder-down substrate including one or more integrated circuits, a single packaged integrated circuit soldered to a main circuit board, and/or a multi-chip module containing two or more integrated circuits.

Figure 39:
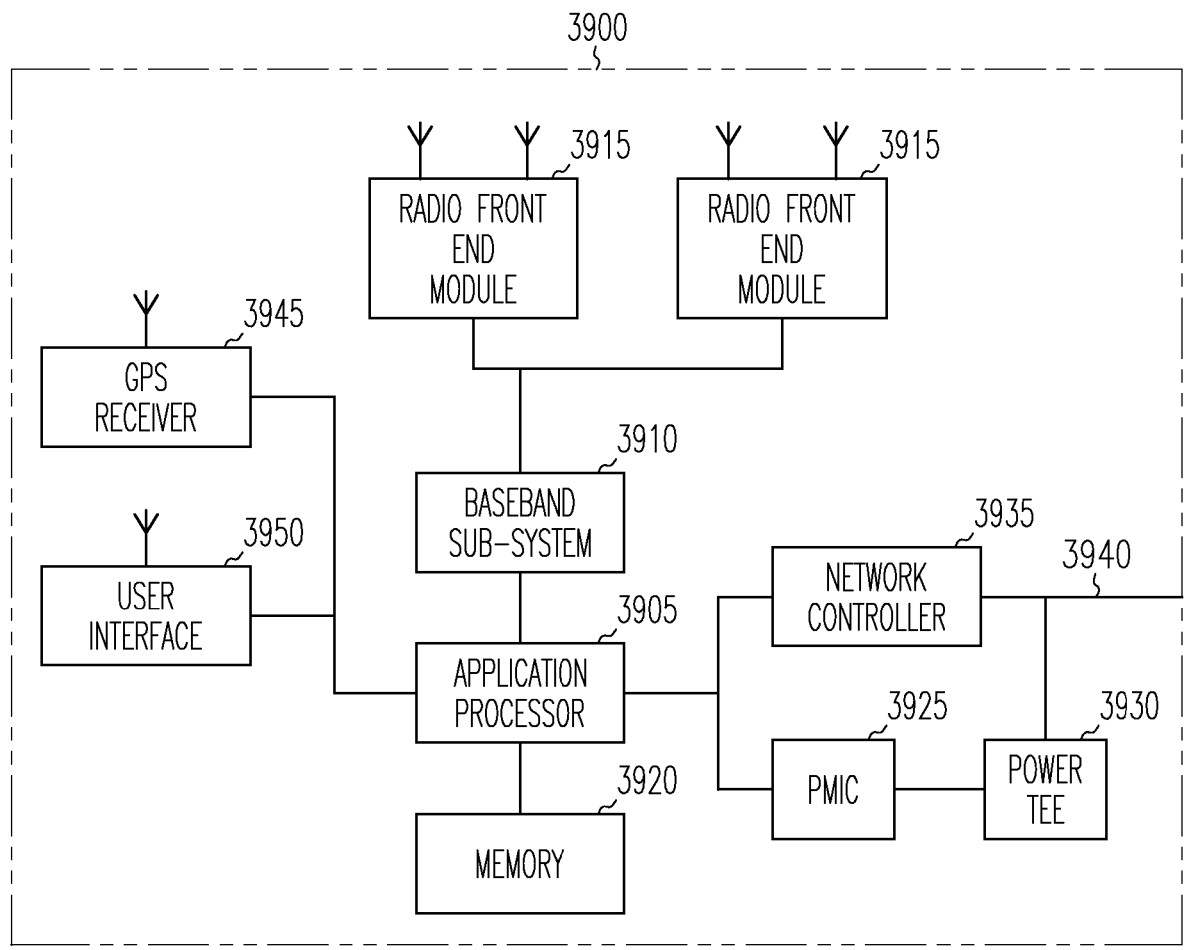
FIG. 39 illustrates abase station or infrastructure equipment radio head in accordance with an aspect.

FIG. 39 illustrates abase station or infrastructure equipment radio head 3900 in accordance with an aspect. The base station radio head 3900 may include one or more of application processor 3905, baseband processor 3910, one or more radio front end modules 3915, memory 3920, power management circuitry 3925, power tee circuitry 3930, network controller 3935, network interface connector 3940, satellite navigation receiver 3945, and user interface 3950.

In some aspects, application processor 3905 may include one or more CPU cores and one or more of cache memory, low drop-out voltage regulators (LDOs), interrupt controllers, serial interfaces such as SPI, I²C or universal programmable serial interface, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 3910 may be implemented, for example, as a solder-down substrate including one or more integrated circuits, a single packaged integrated circuit soldered to a main circuit board or a multi-chip module containing two or more integrated circuits.

In some aspects, memory 3920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 3920 may be implemented as one or more of solder down packaged integrated circuits, socketed memory modules and plug-in memory cards.

In some aspects, power management integrated circuitry 3925 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 3930 may provide for electrical power drawn from a network cable to provide both power supply and data connectivity to the base station radio head 3900 using a single cable.

In some aspects, network controller 3935 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 3945 may include circuitry to receive and decode signals transmitted by one or more navigation satellite constellations such as the global positioning system (GPS), Globalnaya Navigtsionnaya Sputnikovay a Sistema (GLONASS), Galileo and/or BeiDou. The receiver 3945 may provide data to application processor 3905 which may include one or more of position data or time data. Application processor 3905 may use time data to synchronize operations with other radio base stations.

In some aspects, user interface 3950 may include one or more of physical or virtual buttons, such as a reset button, one or more indicators such as light emitting diodes (LEDs) and a display screen.

Figure 40A:
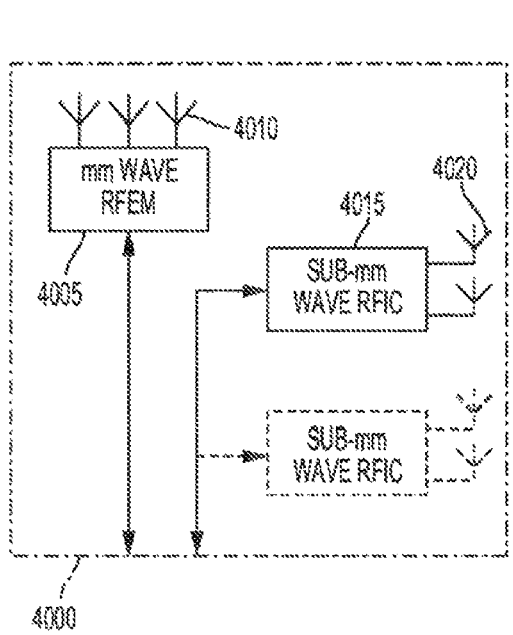
FIG. 40A and FIG. 40B illustrate aspects of a radio front end module.

FIG. 40A illustrates an aspect of a radio front end module 4000 incorporating a millimeter wave radio front end module (RFEM) 4005 and one or more sub-millimeter wave radio frequency integrated circuits (RFIC) 4015. In this aspect, the one or more sub-millimeter wave RFICs 4015 may be physically separated from a millimeter wave RFEM 4005. RFICs 4015 may include connection to one or more antennas 4020. RFEM 4005 may be connected to multiple antennas 4010.

Figure 40B:
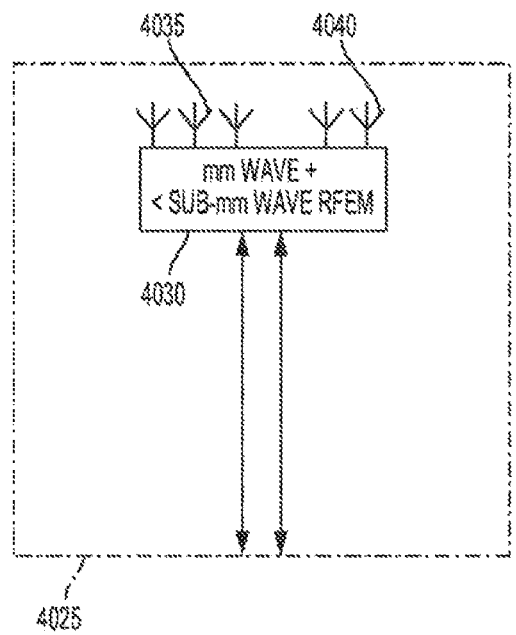

FIG. 40B illustrates an alternate aspect of a radio front end module 4025. In this aspect both millimeter wave and sub-millimeter wave radio functions may be implemented in the same physical radio front end module 4030. RFEM 4030 may incorporate both millimeter wave antennas 4035 and sub-millimeter wave antennas 4040.

Figure 41A:
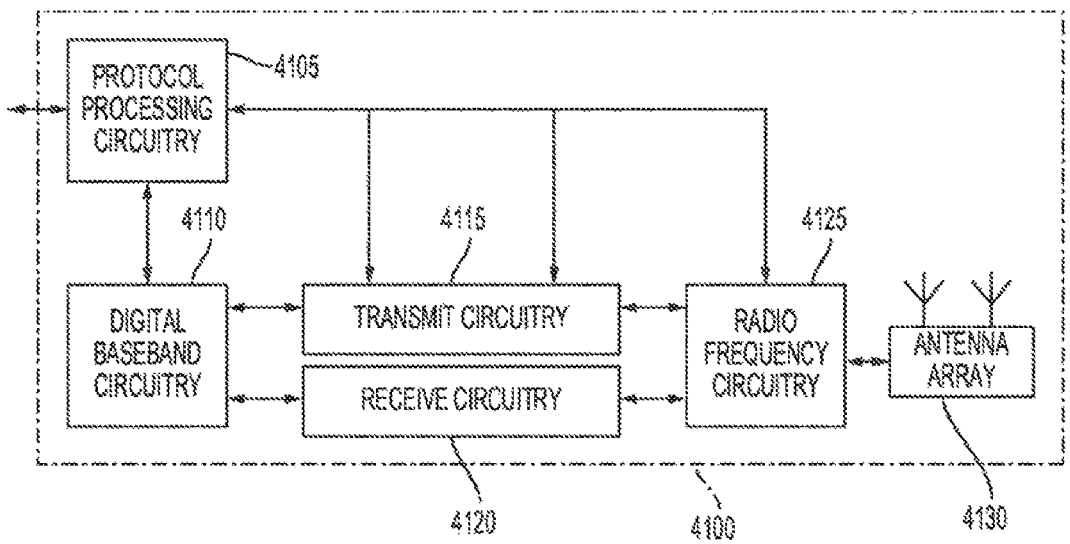
FIG. 41A illustrates an exemplary millimeter wave communication circuitry according to some aspects.

FIG. 41A illustrates an exemplary millimeter wave communication circuitry 4100 according to some aspects. Circuitry 4100 is alternatively grouped according to functions. Components as shown in 4100 are shown here for illustrative purposes and may include other components not shown in FIG. 41A.

Millimeter wave communication circuitry 4100 may include protocol processing circuitry 4105, which may implement one or more of medium access control (MAC), radio link control (RLC), packet data convergence protocol (PDCP), radio resource control (RRC) and non-access stratum (NAS) functions. Protocol processing circuitry 4105 may include one or more processing cores (not shown) to execute instructions and one or more memory structures (not shown) to store program and data information.

Millimeter wave communication circuitry 4100 may further include digital baseband circuitry 4110, which may implement physical layer (PHY) functions including one or more of hybrid automatic repeat request (HARQ) functions, scrambling and/or descrambling coding and/or decoding layer mapping and/or de-mapping modulation symbol mapping received symbol and/or bit metric determination, multi-antenna port pre-coding and/or decoding which may include one or more of space-time, space-frequency or spatial coding reference signal generation and/or detection, preamble sequence generation and/or decoding synchronization sequence generation and/or detection, control channel signal blind decoding and other related functions.

Millimeter wave communication circuitry 4100 may further include transmit circuitry 4115, receive circuitry 4120 and/or antenna array circuitry 4130.

Millimeter wave communication circuitry 4100 may further include radio frequency (RF) circuitry 4125. In an aspect of the invention, RF circuitry 4125 may include multiple parallel RF chains for one or more of transmit or receive functions, each connected to one or more antennas of the antenna array 4130.

In an aspect of the disclosure, protocol processing circuitry 4105 may include one or more instances of control circuitry (not shown) to provide control functions for one or more of digital baseband circuitry 4110, transmit circuitry 4115, receive circuitry 4120, and/or radio frequency circuitry 4125.

Figure 41B:
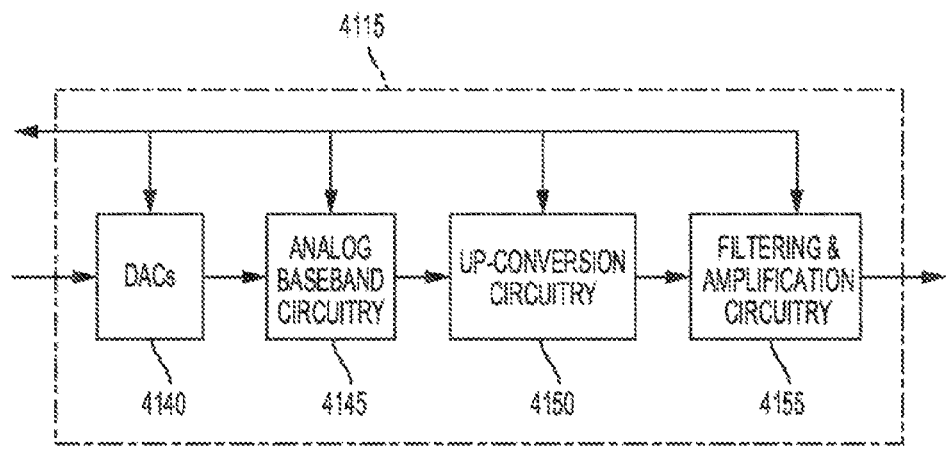
FIGS. 41B and 41C illustrate examples for transmit circuitry in FIG. 41A in some aspects.
Figure 41C:
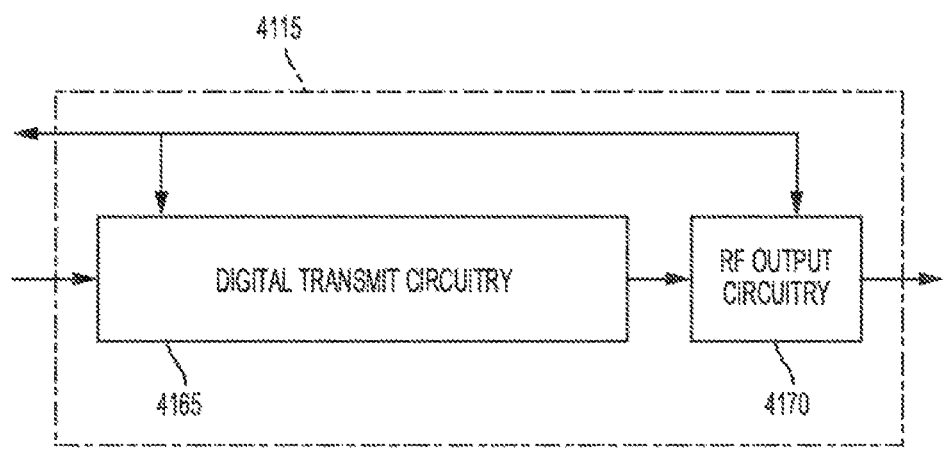

FIGS. 41B and 41C illustrate examples for transmit circuitry 4115 in FIG. 41A in some aspects.

The exemplary transmit circuitry 4115 of FIG. 41B may include one or more of digital to analog converters (DACs) 4140, analog baseband circuitry 4145, up-conversion circuitry 4150 and filtering and amplification circuitry 4155. In another aspect, FIG. 41C illustrates an exemplary transmit circuitry 4115 which includes digital transmit circuitry 4165 and output circuitry 4170.

Figure 41D:
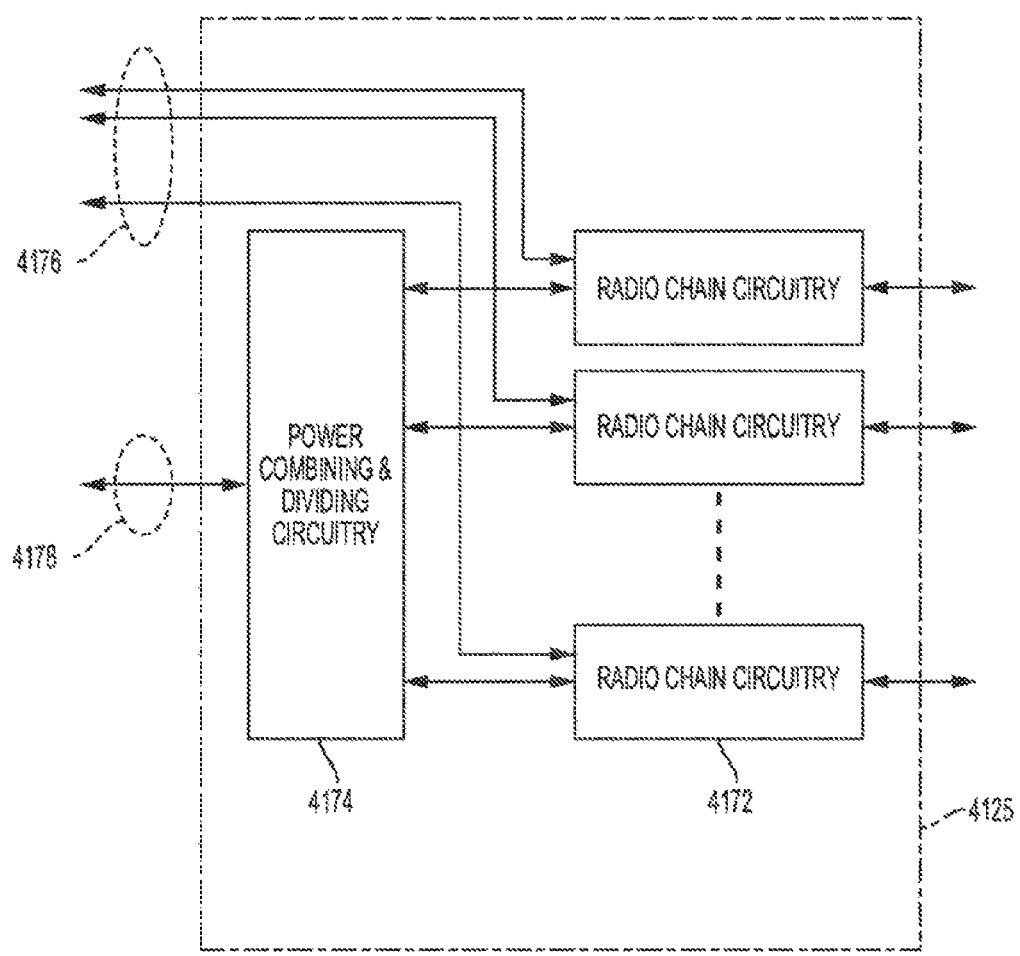
FIG. 41D illustrates an exemplary radio frequency circuitry in FIG. 41A according to some aspects.

As seen in FIG. 41D, radio frequency circuitry 4125 may include one or more instances of radio chain circuitry 4172, which in some aspects may include one or more filters, power amplifiers, low noise amplifiers, programmable phase shifters and power supplies (not shown).

Radio frequency circuitry 4125 may include power combining and dividing circuitry 4174 in some aspects. In some aspects, power combining and dividing circuitry 4174 may operate bidirectionally, such that the same physical circuitry may be configured to operate as a power divider when the device is transmitting and as a power combiner when the device is receiving. In some aspects, power combining and dividing circuitry 4174 may one or more include wholly or partially separate circuitries to perform power dividing when the device is transmitting and power combining when the device is receiving. In some aspects, power combining and dividing circuitry 4174 may include passive circuitry comprising one or more two-way power divider/combiners arranged in a tree. In some aspects, power combining and dividing circuitry 4174 may include active circuitry comprising amplifier circuits.

In some aspects, radio frequency circuitry 4125 may connect to transmit circuitry 4115 and receive circuitry 4120 in FIG. 41A via one or more radio chain interfaces 4176 or a combined radio chain interface 4178.

In some aspects, one or more radio chain interfaces 4176 may provide one or more interfaces to one or more receive or transmit signals, each associated with a single antenna structure which may comprise one or more antennas.

In some aspects, the combined radio chain interface 4178 may provide a single interface to one or more receive or transmit signals, each associated with a group of antenna structures comprising one or more antennas.

Figure 41E:
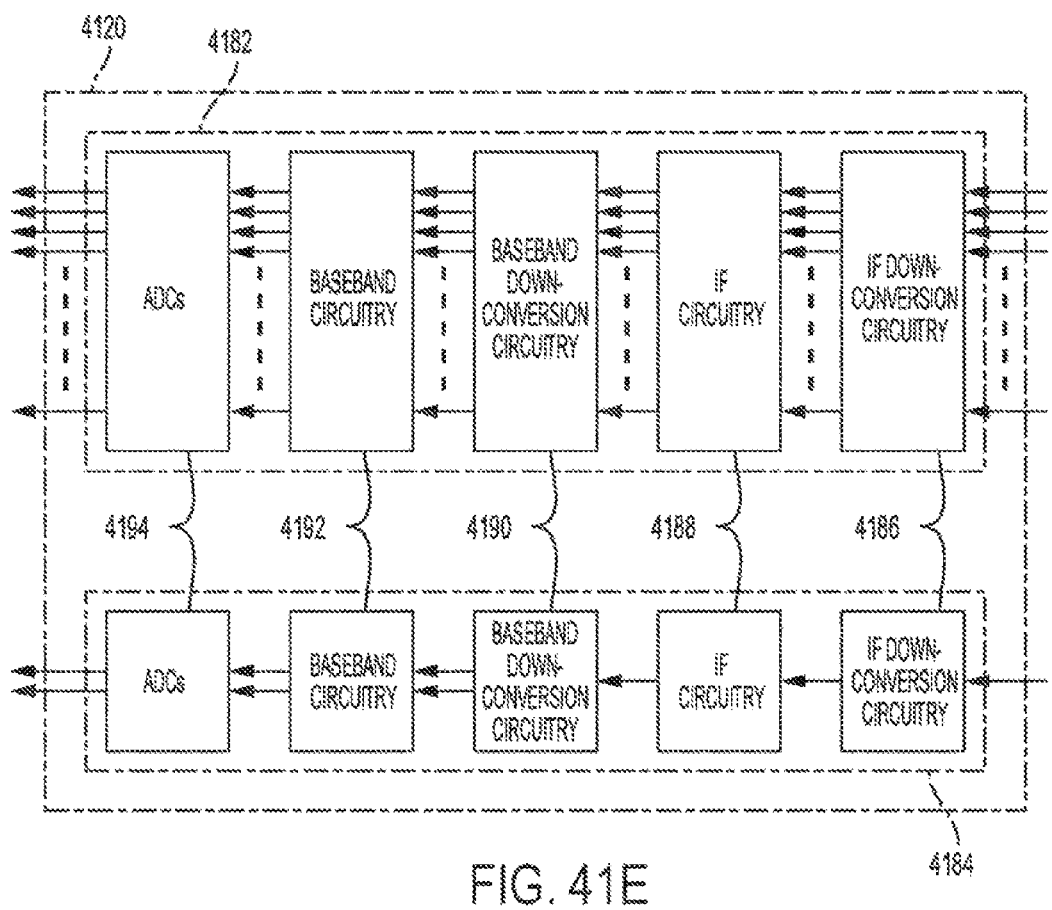
FIG. 41E illustrates exemplary receive circuitry in FIG. 41A according to some aspects.

FIG. 41E illustrates exemplary receive circuitry 4120 in FIG. 41A according to some aspects. Receive circuitry 4120 may include one or more of parallel receive circuitry 4182 and/or one or more of combined receive circuitry 4184.

In some aspects, the one or more parallel receive circuitry 4182 and one or more combined receive circuitry 4184 may include one or more Intermediate Frequency (IF) down-conversion circuitry 4186, IF processing circuitry 4188, baseband down-conversion circuitry 4190, baseband processing circuitry 4192 and analog-to-digital converter (ADC) circuitry 4194.

Figure 42:
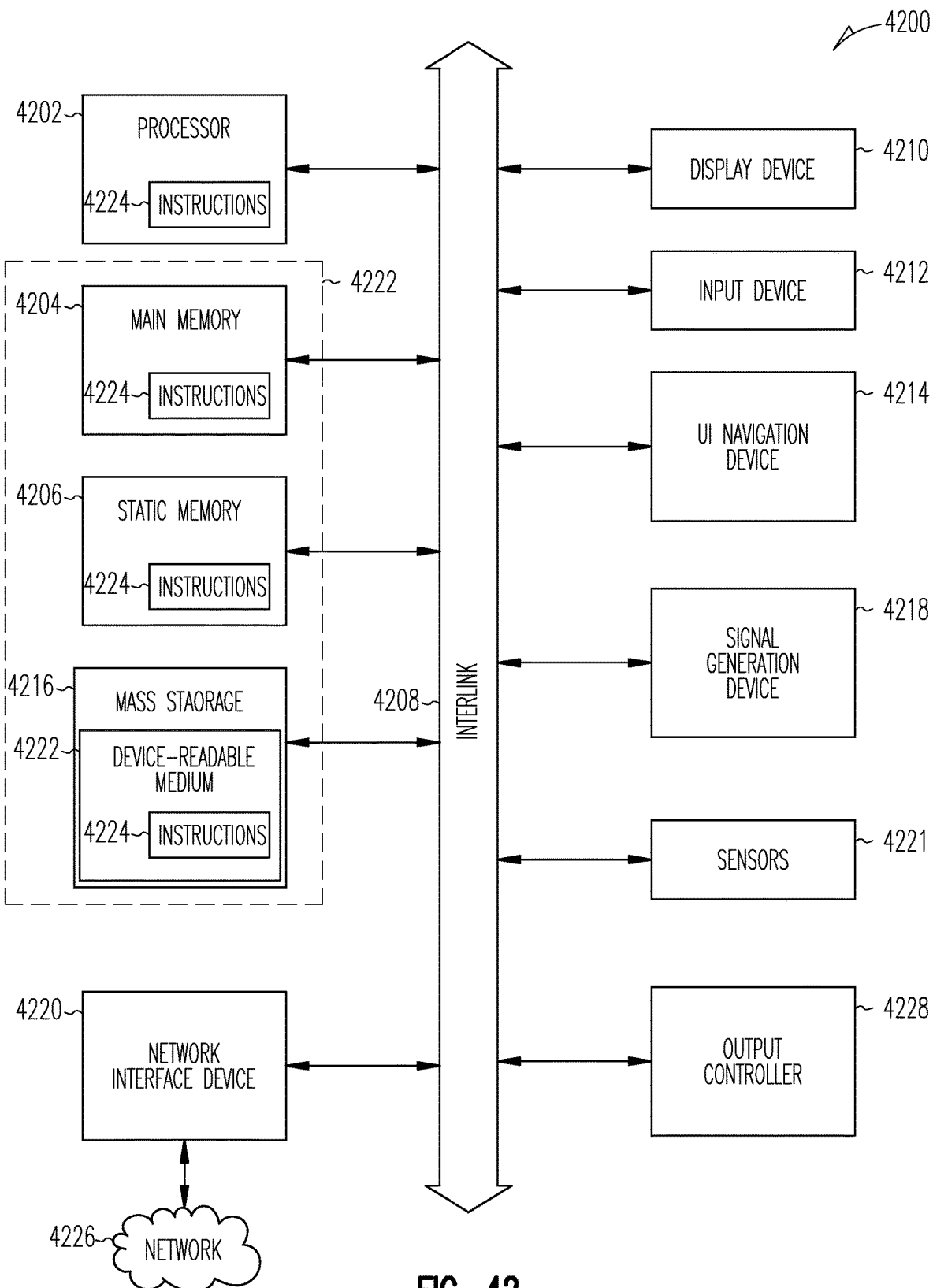
FIG. 42 illustrates a block diagram of a communication device such as an evolved Node-B (eNB), a new generation Node-B (gNB), an access point (AP), a wireless station (STA), a mobile station (M S), or a user equipment (UE), in accordance with some aspects.

FIG. 42 illustrates a block diagram of a communication device such as an evolved Node-B (eNB), a new generation Node-B (gNB), an access point (AP), a wireless station (STA), a mobile station (M S), or a user equipment (UE), in accordance with some aspects. In alternative aspects, the communication device 4200 may operate as a standalone device or may be connected (e.g., networked) to other communication devices.

Circuitry (e.g., processing circuitry) is a collection of circuits implemented in tangible entities of the device 4200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 4200 follow.

In some aspects, the device 4200 may operate as a standalone device or may be connected (e.g., networked) to other devices. In a networked deployment, the communication device 4200 may operate in the capacity of a server communication device, a client communication device, or both in server-client network environments. In an example, the communication device 4200 may act as a peer communication device in peer-to-peer (P2P)(or other distributed) network environment. The communication device 4200 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a singe communication device is illustrated, the term "communication device" shall also be taken to include any collection of communication devices that individually or jointly execute a set (or multiple sets) of instructions to perform any one or more of the methodologies discussed herein, such as cloud computing software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitutes particular module at one instance of time and to constitute a different module at a different instance of time.

Communication device (e.g., UE) 4200 may include a hardware processor 4202 (e.g., a central processing unit (CPU), a graphics processing unit (GPU), a hardware processor core, or any combination thereof), a main memory 4204, a static memory 4206, and mass storage 4207 (e.g., hard drive, tape drive, flash storage, or other block or storage devices), some or all of which may communicate with each other via an interlink (e.g., bus) 4208.

The communication device 4200 may further include a display device 4210, an alphanumeric input device 4212 (e.g., a keyboard), and a user interface (UI) navigation device 4214 (e.g., a mouse). In an example, the display device 4210, input device 4212 and UI navigation device 4214 may be a touch screen display. The communication device 4200 may additionally include a signal generation device 4218 (e.g., a speaker), a network interface device 4220, and one or more sensors 4221, such as a global positioning system (GPS) sensor, compass, accelerometer, or other sensor. The communication device 4200 may include an output controller 4228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4207 may include a communication device-readable medium 4222, on which is stored one or more sets of data structures or instructions 4224 (e.g., software) embodying or utilized by any one or more of the techniques or functions described herein. In some aspects, registers of the processor 4202, the main memory 4204, the static memory 4206, and/or the mass storage 4207 may be, or include (completely or at least partially), the device-readable medium 4222, on which is stored the one or more sets of data structures or instructions 4224, embodying or utilized by any one or more of the techniques or functions described herein. In an example, one or any combination of the hardware processor 4202, the main memory 4204, the static memory 4206, or the mass storage 4216 may constitute the device-readable medium 4222.

As used herein, the term "device-readable medium" is interchangeable with "computer-readable medium" or "machine-readable medium". While the communication device-readable medium 4222 is illustrated as a single medium, the term "communication device-readable medium" may include a single medium or multiple media (e.g., a centralized or distributed database, and/or associated caches and servers) configured to store the one or more instructions 4224.

The term "communication device-readable medium" may include any medium that is capable of storing encoding or carrying instructions (e.g., instructions 4224) for execution by the communication device 4200 and that cause the communication device 4200 to perform any one or more of the techniques of the present disclosure, or that is capable of storing encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 4224 may further be transmitted or received over a communications network 4226 using a transmission medium via the network interface device 4220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax™), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4220 may include one or more physical jacks (e.g., Ethernet, coaxial, or phone jacks) or one or more antennas to connect to the communications network 4226. In an example, the network interface device 4220 may include a plurality of antennas to wirelessly communicate using at least one of single-input multiple-output (SIMO), MIMO, or multiple-input single-output (M ISO) techniques. In some examples, the network interface device 4220 may wirelessly communicate using Multiple User MIMO techniques.

The term "transmission medium" shall be taken to include any intangible medium that is capable of storing encoding or carrying instructions for execution by the communication device 4200, and includes digital or analog communications signals or other intangible medium to facilitate communication of such software. In this regard, a transmission medium in the context of this disclosure is a device-readable medium.

Additional Notes and Examples

Example 1 is an apparatus of a base station (BS), the apparatus comprising memory; processing circuitry, the processing circuitry configured to: associate with a first user equipment (UE) and a second, different UE; determine weight sum rates for the first UE and the second UE; schedule transmissions to first UE and the second UE based on the weight sum rates, wherein the weight sum rates are stored in the memory; encode first data for transmission to the first UE, wherein the first data is transmitted based on the scheduled transmission to the first UE; and encode second data for transmission to the second UE, wherein the second data is transmitted based on the scheduled transmission to the second UE.

In Example 2, the subject matter of Example 1 includes, wherein to schedule transmissions the processing circuitry determines the transmissions will use single directional beamforming and non-orthogonal multiple access.

In Example 3, the subject matter of Example 2 includes, wherein the transmissions are encoded to be multiplexed in a power domain.

In Example 4, the subject matter of Examples 1-3 includes, wherein the processing circuitry is further configured to: determine a first direction of a first beam to transmit the first data to the first UE; and determine a second direction of a second beam to transmit the second data to the second UE.

In Example 5, the subject matter of Example 4 includes, wherein the first direction is equal to the second direction.

In Example 6, the subject matter of Examples 4-5 includes, wherein the first direction is different from the second direction.

In Example 7, the subject matter of Examples 4-6 includes, wherein the processing circuitry is further configured to: determine a first beam in for the first beam; and determine a second beam gin for the second beam.

Example 8 is a method of abase station (BS), the method comprising associating with a first user equipment (UE) and a second, different UE; determining weight sum rates for the first UE and the second UE; scheduling transmissions to first UE and the second UE based on the weight sum rates, wherein the weight sum rates are stored in the memory; encoding first data for transmission to the first UE, wherein the first data is transmitted based on the scheduled transmission to the first UE; and encoding second data for transmission to the second UE, wherein the second data is transmitted based on the scheduled transmission to the second UE.

In Example 9, the subject matter of Example 8 includes, wherein scheduling transmissions comprises determining the transmissions will use single directional beamforming and non-orthogonal multiple access.

In Example 10, the subject matter of Example 9 includes, wherein the transmissions are encoded to be multiplexed in a power domain.

In Example 11, the subject matter of Examples 8-10 includes, determining a first direction of a first beam to transmit the first data to the first UE; and determining a second direction of a second beam to transmit the second data to the second UE.

In Example 12, the subject matter of Example 11 includes, wherein the first direction is equal to the second direction.

In Example 13, the subject matter of Examples 11-12 includes, wherein the first direction is different from the second direction.

In Example 14, the subject matter of Examples 11-13 includes, determining a first beam gain for the first beam; and determining a second beam gain for the second beam.

Example 15 is an apparatus comprising one or more delay cells comprising a passive resistor-capacitor (RC)-RC all-pass filter and configured to provide a group delay; one or more complex taps that comprise: a polyphase filter comprising a passive RC filter, the poly phase filter configured to: receive the group delay as an input; provide a first weight for a magnitude based on the group delay; and provide a second weight for a phase based on the group delay; and a combiner to combine the first weight and the second weight to generate a channel response of a channel.

In Example 16, the subject matter of Example 15 includes, wherein the first delay cell is configured to receive a transmit signal as an input.

In Example 17, the subject matter of Example 16 includes, a transmitter configured to transmit the transmit signal on the channel; and a receiver configured to receive a receive signal, wherein the transmitter and the receiver operate in a full-duplex mode.

In Example 18, the subject matter of Example 17 includes, a second combiner configured to combine the generated channel response of the channel with the receive signal to reduce self-interference from the transmitter, wherein the channel response estimates leakage from the transmitter to the receiver.

In Example 19, the subject matter of Example 18 includes, a switch matrix configured to control a number of active complex taps and a value of the group delay provided as an input.

In Example 20, the subject matter of Example 19 includes, wherein the apparatus is implemented on-chip.

Example 21 is a method implemented on-chip, the method comprising providing using one or more delay cells comprising a passive resistor-capacitor (RC)-RC all-pass filter, a group delay; one or more complex taps that comprise: receiving at a poly phase filter comprising a passive RC filter, the group delay as an input; providing by the polyphase filter, a first weight for a magnitude based on the group delay; and providing by the poly phase filter, a second weight for a phase based on the group delay; and combining by a combiner, the first weight and the second weight to generate a channel response of a channel.

In Example 22, the subject matter of Example 21 includes, receiving at the first delay cell, a transmit signal as an input.

In Example 23, the subject matter of Example 22 includes, transmitting by a transmitter, the transmit signal on the channel; and receiving by a receiver, a receive signal, wherein the transmitter and the receiver operate in a full-duplex mode.

In Example 24, the subject matter of Example 23 includes, combining by a second combiner, the generated channel response of the channel with the receive signal to reduce self-interference from the transmitter, wherein the channel response estimates leakage from the transmitter to the receiver.

In Example 25, the subject matter of Example 24 includes, controlling by a switch matrix, a number of active complex taps and a value of the group delay provided as an input.

Example 26 is an apparatus of a user equipment (UE), the apparatus comprising memory; processing circuitry, the processing circuitry configured to: calculate a distance between the UE and a base station (BS); determine a time duration until a next sector sweep from the BS; calculate an expected angular movement of the UE from a perspective of the BS during the time duration; determine a half power beamwidth setting based on the expected angular movement, wherein the half power beamdwidth is stored in the memory; and encode the half power beamwidth setting for transmission to the BS.

In Example 27, the subject matter of Example 26 includes, wherein the UE has a line-of-sight to the BS.

In Example 28, the subject matter of Examples 26-27 includes, wherein the UE does not have a line-of-sight to the BS, and wherein to calculate the distance the processing circuitry is configured to: calculate a line-of-sight geographical distance between the UE and the BS; and multiply the line-of-sight geographical distance by a scaling factor, wherein the scaling factor is greater than one.

In Example 29, the subject matter of Examples 26-28 includes, wherein the processing circuitry is further configured decode a message from the BS, wherein the message was transmitted with a beamwidth based on the half power beamwidth setting.

In Example 30, the subject matter of Example 29 includes, wherein the beamwidth is greater than 15 degrees.

In Example 31, the subject matter of Examples 26-30 includes, wherein to calculate the expected angular movement the processing circuitry is further configured to: determine a direction of travel from the UE; and determine an expected physical movement of the UE during the time duration, wherein the expected angular movement is based on the direction of travel from the UE and the expected physical movement.

In Example 32, the subject matter of Examples 26-31 includes, wherein the processing circuitry is further configure to decode an information block from a broadcast message, wherein the information block includes an indication of a geolocation of the BS, wherein the distance between the UE the BS is based on the geolocation of the BS.

Example 33 is a method of a user equipment (UE), the method comprising calculating a distance between the UE and a base station (BS); determining a time duration until a next sector sweep from the BS; calculating an expected angular movement of the UE from a perspective of the BS during the time duration; determining a half power beamwidth setting based on the expected angular movement, wherein the half power beamdwidth is stored in the memory; and encoding the half power beamwidth setting for transmission to the BS.

In Example 34, the subject matter of Example 33 includes, wherein the UE has a line-of-sight to the BS.

In Example 35, the subject matter of Examples 33-34 includes, wherein the UE does not have a line-of-sight to the BS, and wherein calculating the distance comprises: calculating a line-of-sight geographical distance between the UE and the BS; and multiplying the line-of-sight geographical distance by a scaling factor, wherein the scaling factor is greater than one.

In Example 36, the subject matter of Examples 33-35 includes, decoding a message from the BS, wherein the message was transmitted with a beamwidth based on the half power beamwidth setting.

In Example 37, the subject matter of Example 36 includes, wherein the beamwidth is greater than 15 degrees.

In Example 38, the subject matter of Examples 33-37 includes, wherein calculating the expected angular movement comprises: determining a direction of travel from the UE; and determining an expected physical movement of the UE during the time duration, wherein the expected angular movement is based on the direction of travel from the UE and the expected physical movement.

In Example 39, the subject matter of Examples 33-38 includes, decoding an information block from a broadcast message, wherein the information block includes an indication of a geolocation of the BS, wherein the distance between the UE the BS is based on the geolocation of the BS.

Example 40 is an apparatus of a base station (BS), the apparatus comprising memory; processing circuitry, the processing circuitry configured to: determine define constraints at an array pattern based on a discrete Fourier transform (DFT) matrix; determine a first azimuth angle for a main beam; determine null points; determine a second azimuth angle for a side beam; and determine a codebook for a full duplex multimeter wave (mmWave) array, wherein the codebook is based on the DFT matrix, the first azimuth angle, the null points, and the second azimuth angle.

In Example 41, the subject matter of Example 40 includes, wherein the null points comprise 0° and 180°.

In Example 42, the subject matter of Examples 40-41 includes, a full duplex transceiver comprising a plurality of mmWave transmitters; and a plurality of mmWave receivers, wherein the codebook reduces self-interference from the plurality of mmWave transmitters.

In Example 43, the subject matter of Example 42 includes, wherein a user equipment is served by a single transmitter.

In Example 44, the subject matter of Examples 42-43 includes, wherein a user equipment is served by multiple transmitters of the plurality of transmitters.

In Example 45, the subject matter of Examples 42-44 includes, an antenna element coupled to a first mmWave receiver and a first mmWave transmitter.

In Example 46, the subject matter of Examples 42-45 includes, a first antenna element coupled to a first mmWave receiver and a second antenna element coupled to a first mmWave transmitter.

Example 47 is a method of a base station (BS), the method comprising determining constraints at an array pattern based on a discrete Fourier transform (DFT) matrix; determining a first azimuth angle for a main beam; determining null points; determining a second azimuth angle for a side beam; and determining a codebook for a full duplex multimeter wave (mmWave) array based on the DFT matrix, the first azimuth angle, the null points, and the second azimuth angle.

In Example 48, the subject matter of Example 47 includes, wherein the null points comprise 0° and 180°.

In Example 49, the subject matter of Examples 47-48 includes, wherein the codebook reduces self-interference at a mmWave receiver from a mmWave transmitter.

In Example 50, the subject matter of Example 49 includes, wherein a user equipment is served by the mmWave transmitter.

In Example 51, the subject matter of Examples 49-50 includes, wherein a user equipment is served by multiple mmWave transmitters.

Example 52 is at least one machine-readable medium including instructions that, when executed by processing circuitry, cause the processing circuitry to perform operations to implement of any of Examples 1-51.

Example 53 is an apparatus comprising means to implement of any of Examples 1-51.

Example 54 is a system to implement of any of Examples 1-51.

Example 55 is a method to implement of any of Examples 1-51.

The above detailed description includes references to the accompanying drawings, which form apart of the detailed description. The drawings show, by way of illustration, specific aspects that may be practiced. These aspects are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The aspects as described above may be implemented in various hardware configurations that may include a processor for executing instructions that perform the techniques described. Such instructions may be contained in a machine-readable medium such as a suitable storage medium or a memory or other processor-executable medium.

The above description is intended to be illustrative, and not restrictive. For example, the above-described examples (or one or more aspects thereof) may be used in combination with others. Other aspects may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects may feature a subset of said features. Further, aspects may include fewer features than those disclosed in a particular example. Thus, the following claims are hereby incorporated into the Detailed Description, with a claim standing on its own as a separate aspect. The scope of the aspects disclosed herein is to be determined with reference to the appended claims, along with the full scope of equivalents to which such claims are entitled.

The invention claimed is:

1. An apparatus of a base station (BS), the apparatus comprising:
memory; and
processing circuitry, the processing circuitry coupled to the memory and configured to:
associate with a first user equipment (UE) and a second, different UE;
determine a first instantaneous rate for the first UE based on beamformed channel gain between the BS and the first UE;
determine a second instantaneous rate for the second UE based on beamformed channel gain between the BS and the second UE;
determine weighted sum rates for the first UE and the second UE, based on the first instantaneous rate for the first UE and the second instantaneous rate for the second UE;
schedule transmissions to the first UE during a first scheduling interval and the second UE during a second scheduling interval based on the weighted sum rates, wherein the weighted sum rates are stored in the memory and the first scheduling interval is different from the second scheduling interval;
encode first data for transmission to the first UE, wherein the first data is transmitted based on the scheduled transmission to the first UE; and
encode second data for transmission to the second UE, wherein the second data is transmitted based on the scheduled transmission to the second UE.

2. The apparatus of claim 1, wherein to schedule transmissions the processing circuitry determines the transmissions will use single directional beamforming and non-orthogonal multiple access.

3. The apparatus of claim 2, wherein the transmissions are encoded to be multiplexed in a power domain.

4. The apparatus of claim 1, wherein the processing circuitry is further configured to:
determine a first direction of a first beam to transmit the first data to the first UE; and
determine a second direction of a second beam to transmit the second data to the second UE.

5. The apparatus of claim 4, wherein the first direction is equal to the second direction.

6. The apparatus of claim 4, wherein the first direction is different from the second direction.

7. The apparatus of claim 4, wherein the processing circuitry is further configured to:
determine a first beam gain for the first beam; and
determine a second beam gain for the second beam.

8. The apparatus of claim 1, wherein the processing circuitry is further configured to:
determine the first instantaneous rate and the second instantaneous rate for further based on a power sharing parameter, the power sharing parameter indicating a fraction of transmit power of the BS allocated to the first UE.

9. The apparatus of claim 1, wherein the processing circuitry is further configured to:
determine the weighted sum rates for the first UE and the second UE using at least one weight value configured according to instantaneous feedback from the first UE and the second UE at time t, the instantaneous feedback indicating the average rate of the first UE and the second UE at time (t−1).

10. A non-transitory computer-readable storage medium that stores instructions for execution by one or more processors of a base station (BS), the instructions to cause the BS to perform operations comprising:
associating with a first user equipment (UE) and a second, different UE;
determining a first instantaneous rate for the first UE based on beamformed channel gain between the BS and the first UE;
determining a second instantaneous rate for the second UE based on beamformed channel gain between the BS and the second UE;
determining weighted sum rates for the first UE and the second UE, based on the first instantaneous rate for the first UE and the second instantaneous rate for the second UE;
scheduling transmissions to the first UE during a first scheduling interval and the second UE during a second scheduling interval based on the weighted sum rates, wherein the weighted sum rates are stored in the memory and the first scheduling interval is different from the second scheduling interval;
encoding first data for transmission to the first UE, wherein the first data is transmitted based on the scheduled transmission to the first UE; and encoding second data for transmission to the second UE, wherein the second data is transmitted based on the scheduled transmission to the second UE.

11. The non-transitory computer-readable storage medium of claim 10, wherein the operations for scheduling the transmissions comprise:
   determining the transmissions will use single directional beamforming and non-orthogonal multiple access.

12. The non-transitory computer-readable storage medium of claim 11, wherein the transmissions are encoded to be multiplexed in a power domain.

13. The non-transitory computer-readable storage medium of claim 10, the operations further comprising:
   determining a first direction of a first beam to transmit the first data to the first UE; and
   determining a second direction of a second beam to transmit the second data to the second UE.

14. The non-transitory computer-readable storage medium of claim 13, wherein the first direction is equal to the second direction.

15. The non-transitory computer-readable storage medium of claim 13, wherein the first direction is different from the second direction.

16. The non-transitory computer-readable storage medium of claim 13, the operations further comprising:
   determining a first beam gain for the first beam; and
   determining a second beam gain for the second beam.

17. The non-transitory computer-readable storage medium of claim 10, the operations further comprising:
   determining the first instantaneous rate and the second instantaneous rate for further based on a power sharing parameter, the power sharing parameter indicating a fraction of transmit power of the BS allocated to the first UE.

18. The non-transitory computer-readable storage medium of claim 10, the operations further comprising:
   determining the weighted sum rates for the first UE and the second UE using at least one weight value configured according to instantaneous feedback from the first UE and the second UE at time t, the instantaneous feedback indicating the average rate of the first UE and the second UE at time (t−1).

* * * * *